(12) United States Patent
Nam

(10) Patent No.: US 6,515,713 B1
(45) Date of Patent: Feb. 4, 2003

(54) METHOD AND APPARATUS WHICH COMPENSATES FOR CHANNEL DISTORTION

(75) Inventor: Ho Jun Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/476,793

(22) Filed: Dec. 30, 1999

(30) Foreign Application Priority Data

Dec. 31, 1998 (KR) .............................................. 98-62826
Jun. 16, 1999 (KR) .............................................. 99-22565

(51) Int. Cl.[7] .............................................. H04N 5/21
(52) U.S. Cl. ......................... 348/614; 348/21; 348/607; 375/346; 455/65
(58) Field of Search ................................. 348/614, 607, 348/608, 611, 612, 619, 21, 470; 375/346, 349, 229, 231; 455/63, 65, 67.3; H04N 5/21

(56) References Cited

U.S. PATENT DOCUMENTS

| | | | | |
|---|---|---|---|---|
| 5,341,177 A | * | 8/1994 | Roy et al. | 348/614 |
| 5,353,069 A | * | 10/1994 | Kobo et al. | 348/611 |
| 5,623,318 A | * | 4/1997 | Lee | 348/614 |
| 5,623,320 A | * | 4/1997 | Rim | 348/614 |
| 5,886,748 A | * | 3/1999 | Lee | 348/614 |
| 6,229,560 B1 | * | 5/2001 | Jun | 348/21 |
| 6,246,444 B1 | * | 6/2001 | Kim | 348/614 |
| 6,249,321 B1 | * | 6/2001 | Bae et al. | 348/614 |
| 6,304,299 B1 | * | 10/2001 | Frey et al. | 348/614 |
| 6,313,882 B1 | * | 11/2001 | Limberg et al. | 348/614 |

* cited by examiner

Primary Examiner—John Miller
Assistant Examiner—Jean W. Désir
(74) Attorney, Agent, or Firm—Birch, Stewart Kolasch & Birch, LLP

(57) ABSTRACT

A method and apparatus for compensating for channel distortion is disclosed. In the present invention, equalization is performed in the treating sequence mode when the moving ghost does not exist in the channel and there is no possibility that the equalizer diverges, the data mode is cancelled and the equalization is carried out in the blind mode when the moving ghost does not exist in the channel but there is a possibility that the equalizer diverges, the equalizer is executed in the data mode when there is no possibility that the equalizer diverges but there exists the moving ghost including slowly moving ghosts in the channel, and the equalization is performed in the data mode and blind mode when the moving ghost exists and there is a possibility that the equalizer diverges.

25 Claims, 17 Drawing Sheets signal power= $\dfrac{(168)^2+(120)^2+(72)^2+(24)^2}{4}$ =12096

METHOD AND APPARATUS WHICH COMPENSATES FOR CHANNEL DISTORTION

BACKGROUND OF THE INVENTION

1. Field of the Invention

The present invention relates to a digital TV system, and more particularly to a method and apparatus for compensating channel distortion in the digital TV system.

2. Discussion of Related Art

Generally, a digital TV system removes ghost signals generated in a channel using the equalizer. Specifically, in the digital TV system, the received signal includes a training sequence signal in a field synchronous section of each field to help a receiver perform equalization. The receiver compensates for distortion generated in the channel using the training sequence. FIG. 1 shows the structure of one frame of a conventional digital TV signal and FIG. 2 shows a structure of the field synchronizing signal of FIG. 1.

Referring to FIG. 1, a frame includes two fields. Each field has 313 data segments where one including one field synchronous segment containing the training sequence signal and 312 general data segments. Also, each data segment consists of a 4 symbol data segment synchronizing signal and 828-symbol data. FIG. 2 shows a field synchronizing signal of one data segment length including a data segment synchronizing pattern in the first four symbols, pseudo random sequences of PN 511, PN 63, PN 63 and PN 63 in the following symbols, and information related with the VSB mode is in the next symbols. The polarity of the second of the three PN 63 sections alternates. That is, the polarity changes from '1' to '0' and from '0' to '1'. Accordingly, even and odd fields are determined according to the polarity of the second PN 63.

FIG. 3 shows modelling of a conventional channel having no moving ghost. When there is no moving ghost in the channel, a high definition TV (HDTV) receiver receives an original signal and ghost signal, as shown in FIG. 3. This ghost signal loaded in the channel is removed by the equalizer of the receiver using the training sequence signal in the field synchronizing signal. When a moving ghost signal does not exist in the channel, the level of the received signal as seen by the HDTV is almost always uniform. Thus, the HDTV receiver is able to remove the ghost using only the training sequence in each field synchronizing section.

However, when a moving ghost is loaded on the channel, the training sequence is not sufficient to remove a moving ghost because the state of the received signal would changes constantly. For example, a moving ghost generated due to an airplane, as shown in FIG. 4, varies in sequence of 1→2→3. Accordingly, the conventional method of removing the ghost existing in the channel using only the training sequence cannot effectively cope with the moving ghost in the channel, resulting in a deterioration in the performance of the system.

SUMMARY OF THE INVENTION

Accordingly, an object of the present invention is to solve at least the problems and disadvantages of the related art.

An object of the present invention is to provide a method and apparatus for compensating channel distortion by detecting and removing a moving ghost included in a received signal.

Another object of the present invention is to provide a method and apparatus for compensating channel distortion performing equalization using a data portion as well as a training sequence when a received signal has a moving ghost, to thereby effectively cope with a case where the ghost changes quickly in a channel.

A further object of the present invention is to provide a method and apparatus which compensates for channel distortion by detecting and removing a moving ghost that moves slowly.

A still further object of the present invention is to provide a method and apparatus which compensates for channel distortion by performing equalization in a blind mode when it is possible for an equalizer to diverge, to thereby carry out stable equalization.

A still further object of the present invention is to provide a method and apparatus which compensates for channel distortion by resetting a channel decoder including the equalizer to start from the beginning when the equalizer is already diverged, to thereby perform stable equalization.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for compensating channel distortion comprises calculating a DC value from input data, reading the DC value a predetermined number of times in a specific cycle, detecting maximum and minimum values from the read DC values, judging if there is a moving ghost in the channel from the difference between the maximum and minimum values, and judging if three is a possibility that the equalizer diverges from the MSE of a signal equalized by the equalizer; performing the equalization in the training sequence mode if it is judged that the moving ghost does not exist in the channel and if there is no possibility that the equalizer would diverge; carrying out the equalization in the blind mode if it is judged that the moving ghost does not exist in the channel but there is a possibility that the equalizer would diverge; executing the equalization in the data mode if it is judged that the moving ghost exists in the channel and there is no possibility that the equalizer would diverges; and performing the equalization in the data mode and blind mode when it is judged that the moving ghost exists in the channel and there is a possibility that the equalizer would diverges.

Particularly, the present invention includes judging that a moving ghost does not exist in the channel if the difference between the maximum and minimum values of the DC values, which are read a predetermined number of times in a specific cycle, is smaller than a predetermined first critical value; cancelling the data mode when it is judged that there is no moving ghost in the channel; and deciding that there is no possibility that the equalizer would diverge when it is judged that the MSE value of the signal equalized by the equalizer is smaller than a predetermined second critical value, to operate the equalizer in the training sequence mode.

The present invention also comprises deciding that there is no moving ghost in the channel when it is judged that the difference between the maximum and minimum values of the DC values, read a predetermined number of times in a specific cycle, is smaller than the predetermined first critical value; cancelling the data mode when it is judged that there is no moving ghost in the channel; and deciding that there is a possibility that the equalizer would diverge when it is judged that the MSE value of the signal equalizer by the equalizer is larger than the predetermined second critical second critical value, to operate the equalizer in the blind mode.

The present invention further comprises deciding that the moving ghost exists in the channel when it is judged that the difference between the maximum and minimum values of the DC values, read a predetermined number of times in a specific cycle, is larger than the predetermined first critical value; turning on the data mode when the moving ghost exists in the channel and the VSB mode of the input data corresponds to a mode for terrestrial broadcasting; and deciding that there is no possibility that the equalizer would diverge when it is judged that the MSE value of the signal equalized by the equalizer is smaller than the predetermined second critical value, to operate the equalizer in the data mode.

The present invention further comprises deciding that the moving ghost exists in the channel when it is judged that the difference between the maximum and minimum values of the DC values, read a predetermined number of times in a specific cycle, is large than the predetermined first critical value; turning on the data mode when the moving ghost exists in the channel and the VSB mode of the input data corresponds to a mode for terrestrial broadcasting; and deciding that there is a possibility that the equalizer would diverge when it is judged that the MSE value of the signal equalized by the equalizer is larger than the predetermined second critical value, to operate the equalizer in the blind mode.

In another embodiment, a method for compensating channel distortion according to the present invention comprises calculating a DC value from input data, reading the DC value a predetermined number of times in a specific cycle, detecting maximum and minimum values from the read DC values and storing them; shifting each values of a plurality of memories to the next memory and storing the minimum value in the memory which is finally left; judging if the moving ghost exists in the channel using the difference between the stored maximum and minimum values and the difference between the minimum value stored in the memory and current maximum value, and judging if there is a possibility that the equalizer would diverge from the MSE value of a signal equalized by the equalizer; performing the equalization in the training sequence mode when it is judged that the moving ghost does not exist in the channel and there is no possibility that the equalizer would diverge; carrying out the equalization in the blind mode when it is judged that the moving ghost does not exist in the channel but there is a possibility that the equalizer would diverge; executing the equalization in the data mode when it is judged that the moving ghost exists in the channel and there is no possibility that the equalizer would diverge; and performing the equalization in the data mode and blind mode simultaneously when it is judged that the moving ghost exists in the channel and there is a possibility that the equalizer would diverge.

The judgement step comprises deciding if the difference between the maximum and minimum values is smaller than a predetermined first critical value; sequentially comparing the minimum values stored in the plurality of memories with a currently read maximum value and judging if the difference between them is larger than a predetermined third critical value when the difference between the maximum and minimum values is smaller than the predetermined first critical value; and judging that there exists the moving ghost in the channel when the difference between the maximum and minimum values is larger than the first critical value, or the difference between the value stored in each memory and the currently read maximum value is larger than the third critical value.

In still another embodiment of the method for compensating channel distortion according to the present invention comprises calculating a DC value from input data, reading the DC value a predetermined number of times in a specific cycle, detecting maximum and minimum values from the read DC values, calculating the average value of them and storing it; shifting each of values of a plurality of memories to the next memory and storing the average value in the memory which is finally left; judging if the moving ghost exists in the channel using the difference between the stored maximum and minimum values and the difference between the average value stored in the memory and current average value, and judging if there is a possibility that the equalizer would diverge from the MSE value of a signal equalized by the equalizer; performing the equalization in the training sequence mode when it is judged that the moving ghost does not exist in the channel and there is no possibility that the equalizer would diverge; carrying out the equalization in the blind mode when it is judged that the moving ghost does not exist in the channel but there is a possibility that the equalizer would diverge; executing the equalization in the data mode when it is judged that the moving ghost exists in the channel and there is no possibility that the equalizer would diverge; and performing the equalization in the data mode and blind mode simultaneously when it is judged that the moving ghost exists in the channel and there is a possibility that the equalizer would diverge.

An apparatus which compensates for channel distortion according to the present invention comprises an analog/digital converter for converting an input signal into digital data; a synchronizing signal detector for detecting synchronizing signals from the digital data; a VSB mode detector for detecting a VSB mode from the digital data; an input MSE calculator for calculating the MSE of the digital data; a DC calculator for calculating a DC value included in the digital data; an equalizer for removing a ghost included in the digital data in at least one of three modes of training sequence mode, data mode and blind mode; an output MSE calculator for calculating the MSE of data equalized by the equalizer; and a controller for determining the equalization mode of the equalizer using the operation results of the VSB mode detector, input MSE calculator, DC calculator and output MSE calculator, and generating a corresponding control signal.

The controller resets the equalizer when it is judged that the synchronizing signal detector did not detect the synchronizing signals, or the equalizer completely diverged.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Generally, a predetermined DC value is inserted in a digital TV signal before transmission for carrier recovery at the receiver. The DC value appears to be a pilot in the frequency spectrum, helping the receiving to recover carriers. The DC value calculated from the data input to the receiver is fixed when a moving ghost does not exist in a channel because the DC value is uniform at all time. Accordingly, the present invention judges if the moving ghost exists in the channel using the fact that the DC value of input data is uniform when there is no moving ghost in the channel, and converts the mode of an equalizer into a data mode which uses general data portions as well as the field synchronizing signal including the training sequence for equalization when it is judged that the moving ghost exists from the existence of ghost that moves very slowly. Furthermore, the present invention judges if the equalizer diverges using the mean square error (MSE) value of the input and output of the equalizer, and converts the mode of the equalizer into a blind mode when it is judged that there is a possibility that the equalizer diverges, adaptively operating the equalizer according to channel state. Here, the blind mode means sequential performance of 2-level slicing, 4-level slicing and 8-level slicing, having a predetermined time interval therebetween.

Figure 5:
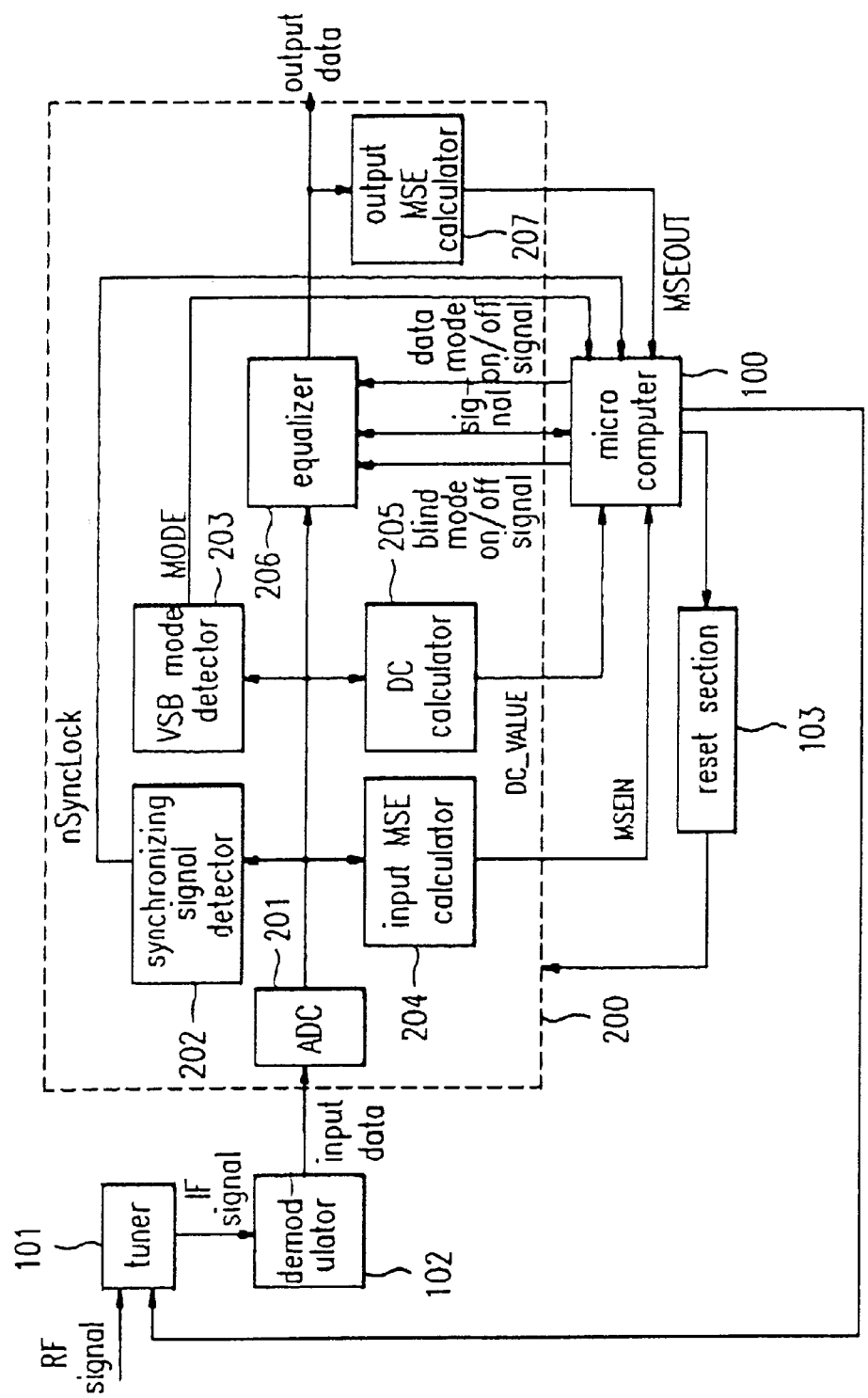
FIG. 5 is a block diagram of an apparatus which compensates for channel distortion according to the present invention.

A described above, the present invention effectively and quickly removes the moving ghost which varies each moment, and performs equalization even when there is a possibility of the divergence of equalizer, thereby maximizing the performance of the receiver in accordance with a channel state. FIG. 5 shows an apparatus which compensates for channel distortion according to the present invention.

Referring to FIG. 5, the apparatus includes a tuner 101 which turns a desired channel from RF signals received through an antenna and converts the RF signal of the tuned channel into an intermediate frequency (IF) signal; a demodulator 102 which demodulates the IF signal of the channel tuned by the tuner 101, a channel decoder 200 which removes the ghost included in data demodulated by the demodulator 102; a microcomputer 100 which controls the removal of ghost by the channel decoder 200 and sends a signal to reset the tuner 101 as necessary; and a reset section 103 which resets the channel decoder 200 under the control of the microcomputer 100.

The channel decoder 200 includes an analog/digital converter (ADC) 201 for converting input data into 1C-bit digital data; a synchronizing signal detector 202 for detecting synchronizing signals from the 10-bit digital data; a VSB mode detector 203 for detecting the VSB mode from the 10-bit digital data; an input MSE calculator 204 for calculating the MSE of the input 10-bit digital data; a DC calculator 205 for calculating a DC value including in the 10-bit digital data; an equalizer 206 for removing the ghost or like contained in the 10-bit digital data; and an output MSE calculator 207 for calculating the MSE of the equalized data.

The microcomputer 100 receives the operation results of the synchronizing signal detector 202, the VSB mode detector 203, the input MSE calculator 204, the DC calculator 205 and the output MSE calculator 207; determines the mode of the equalizer 206, being selected from one of a training sequence mode, data mode or blind mode; and outputs a corresponding mode on/off signal to the equalizer 206.

Figure 6:
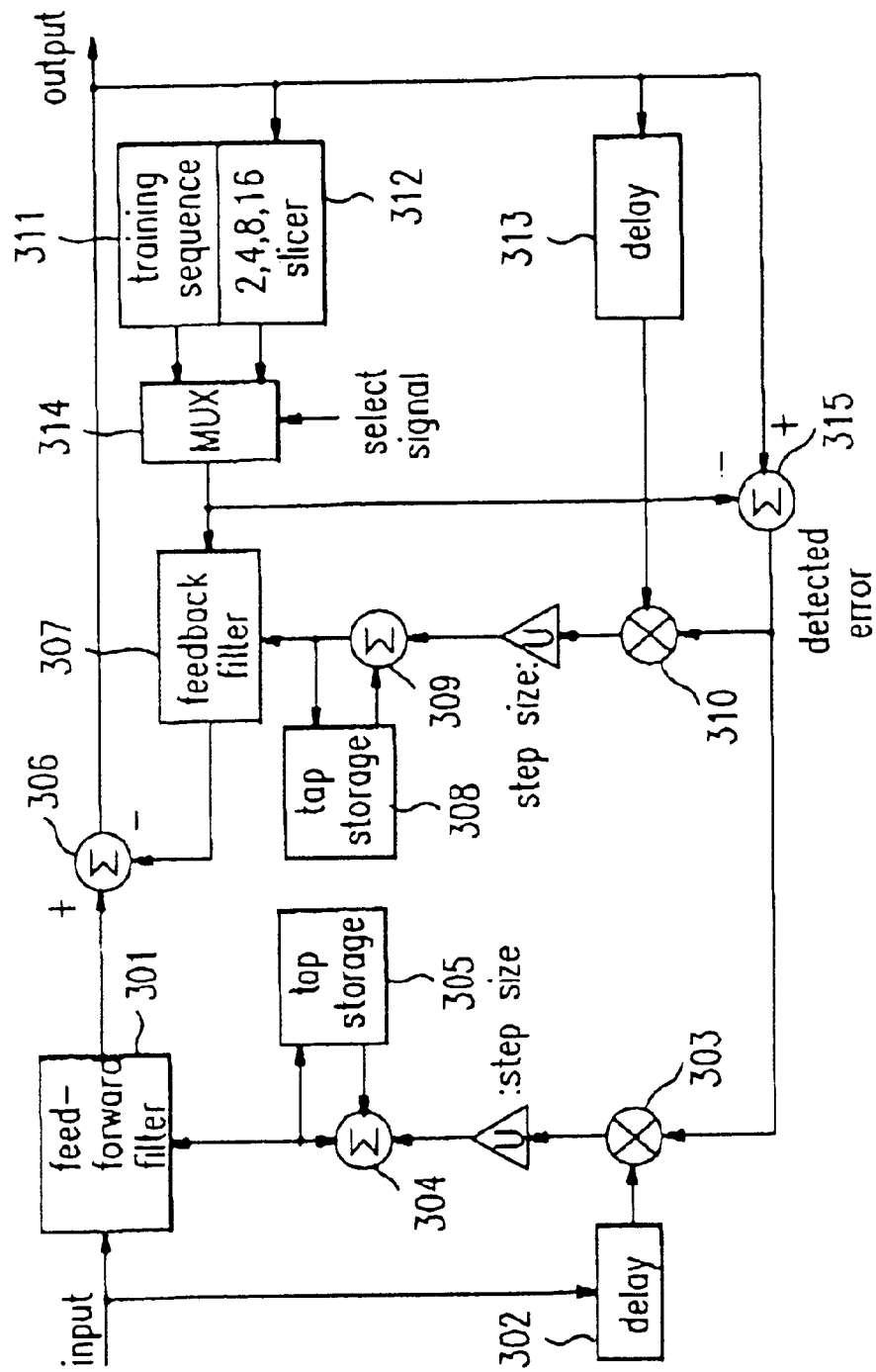
FIG. 6 is a block diagram of the equalizer of FIG. 5.
Figure 7A:
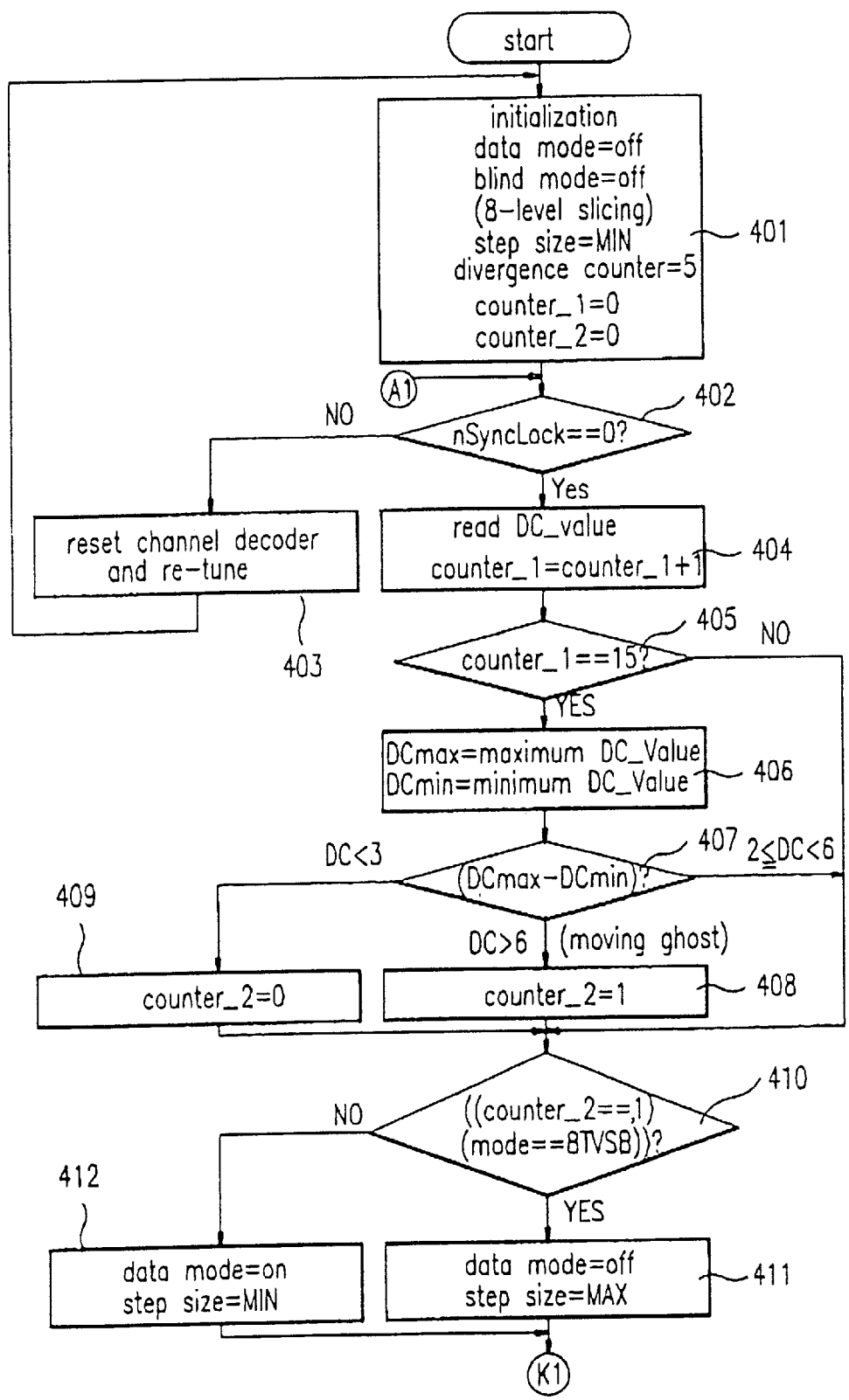
FIGS. 7A to 7D are flow charts showing a method for compensating channel distortion according to a first embodiment of the present invention.
Figure 7B:
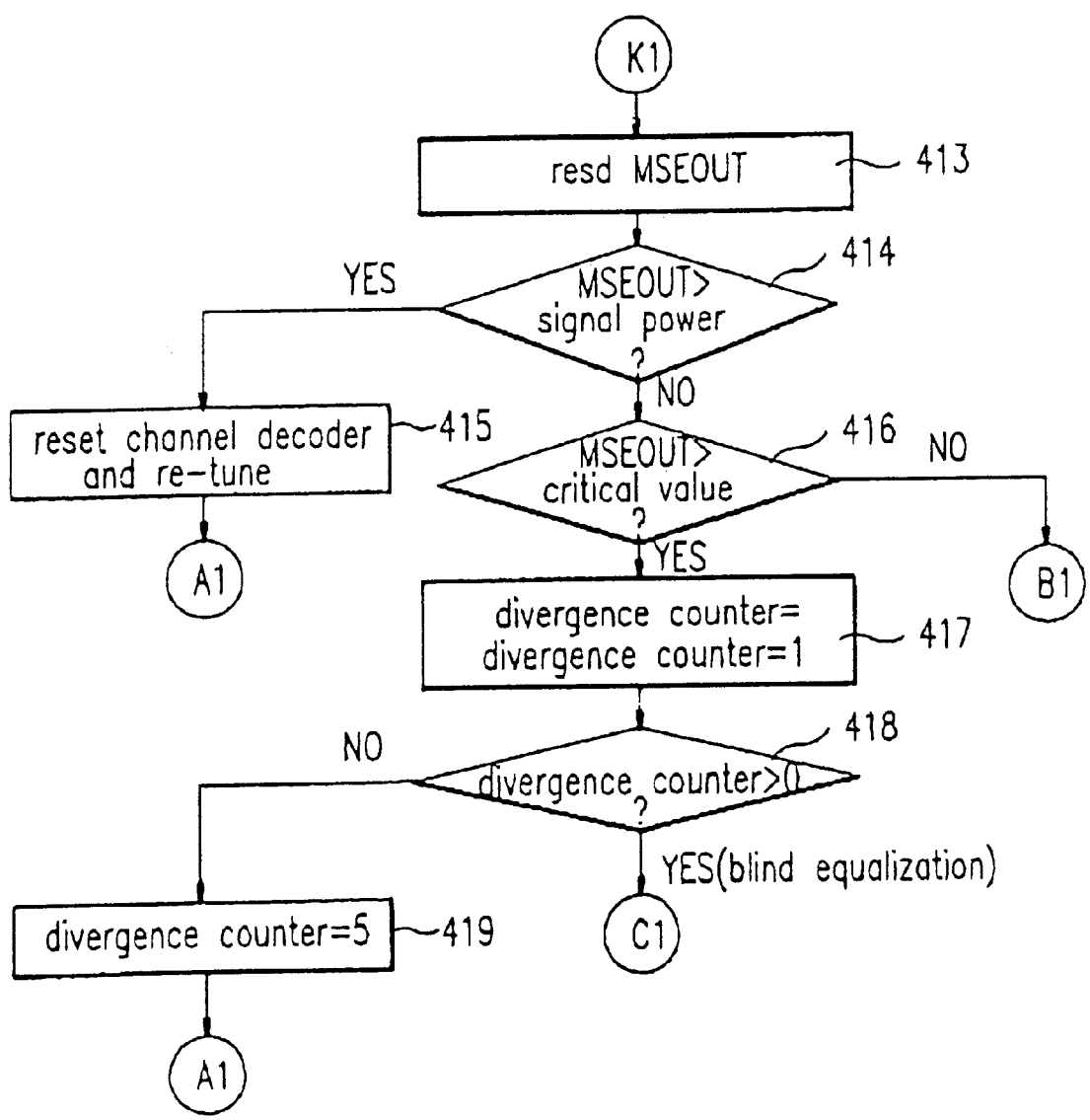
Figure 7C:
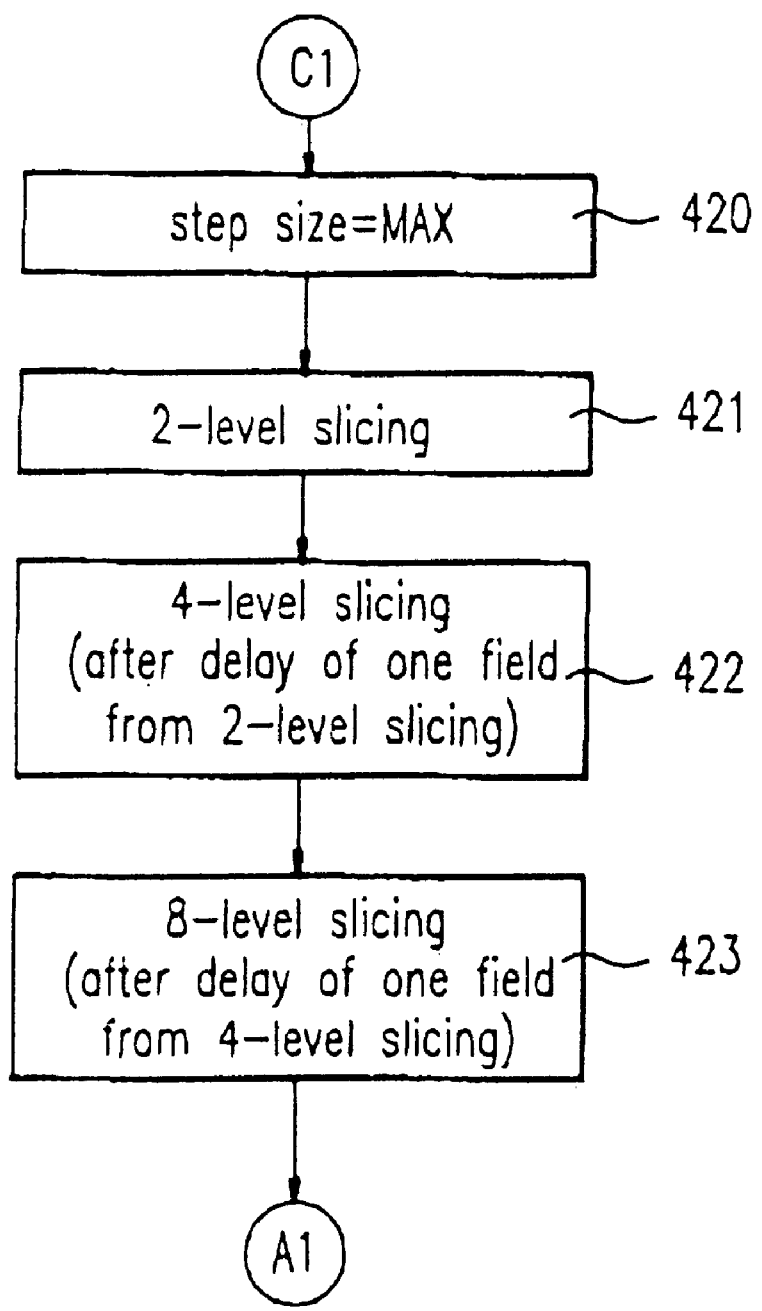
Figure 7D:
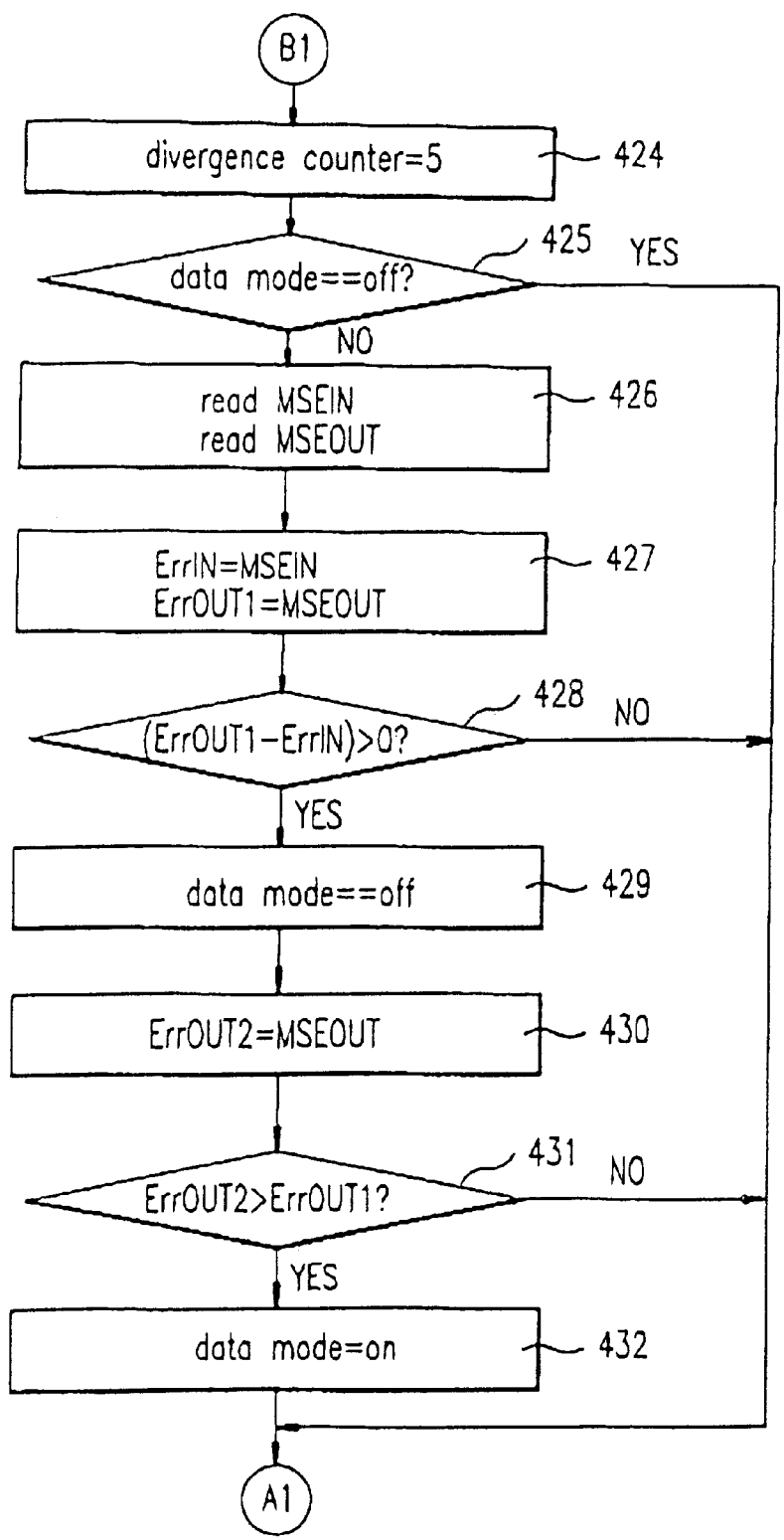

FIG. 6 is a block diagram of the equalizer in FIG. 5. The equalizer includes a feedforward filter 301 and a feedback filter 307. The feedforward filter 301 removes near-by ghost and the feedback filter 307 removes long ghost and residual ghost generated by the feedforward filter 301. At this time, when the step size of the equalizer is large, convergence speed of the equalizer 206 becomes fast but the residual error after convergence is severe. On the contrary, with a small step size, the convergence speed of the equalizer 206 becomes slow but the residual error is minute. In the present invention, three modes of the training sequence mode, the data mode and the blind mode are employed as the mode of the equalizer 206. These three modes are briefly explained below.

Figure 1:
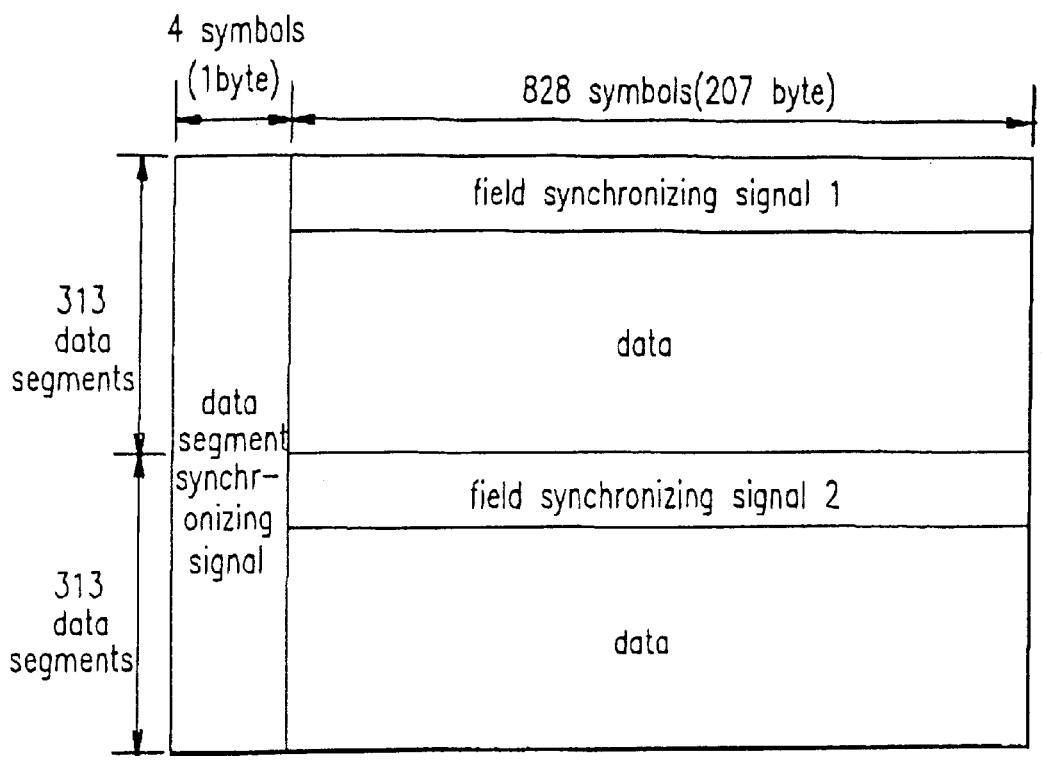
FIG. 1 shows a VSB data frame in the related art.
Figure 2:
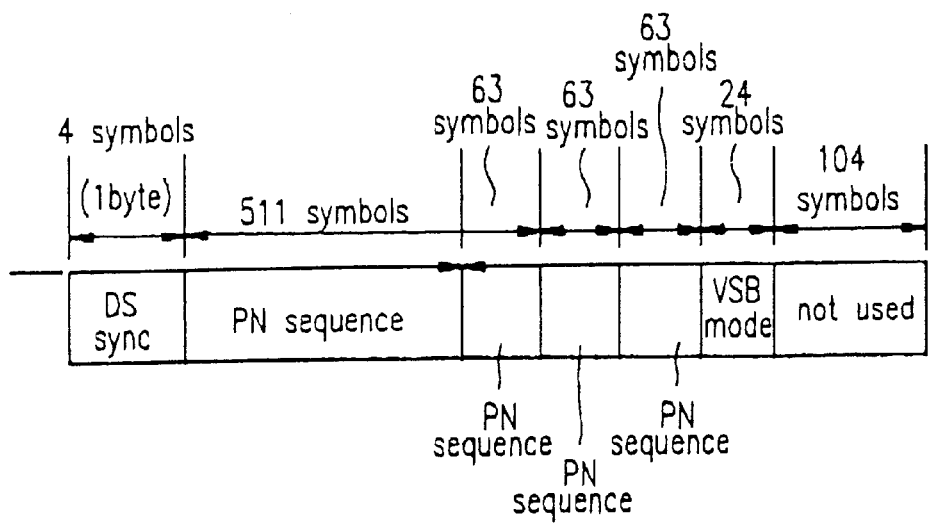
FIG. 2 shows a structure of the data field synchronizing portion of FIG. 1.
Figure 3:
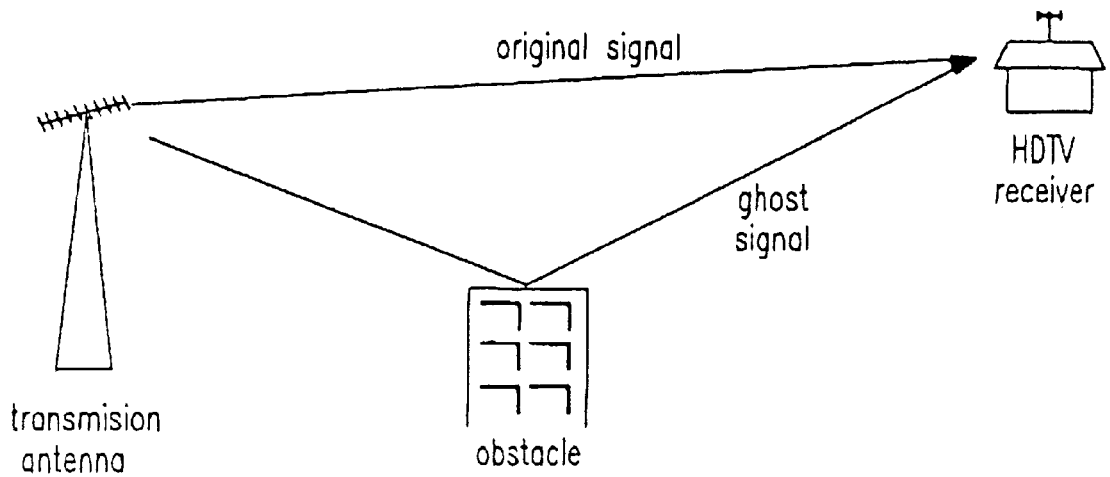
FIG. 3 shows modelling of a general channel having no moving ghost.

The training sequence mode is a method of performing equalization using the training sequence inserted in the field synchronizing section of each field, as shown in FIG. 1. Since the training sequence is known, the predetermined training sequence is compared with the training sequence of the input data to obtain a distortion information of the channel. The channel distortion information is then applied to the following input data, to thereby compensate for the discussion on the channel. The training sequence mode allows the receiver to carry out equalization effectively when there is no moving ghost, i.e. when the distortion, on the channel is uniform all the time.

Figure 4:
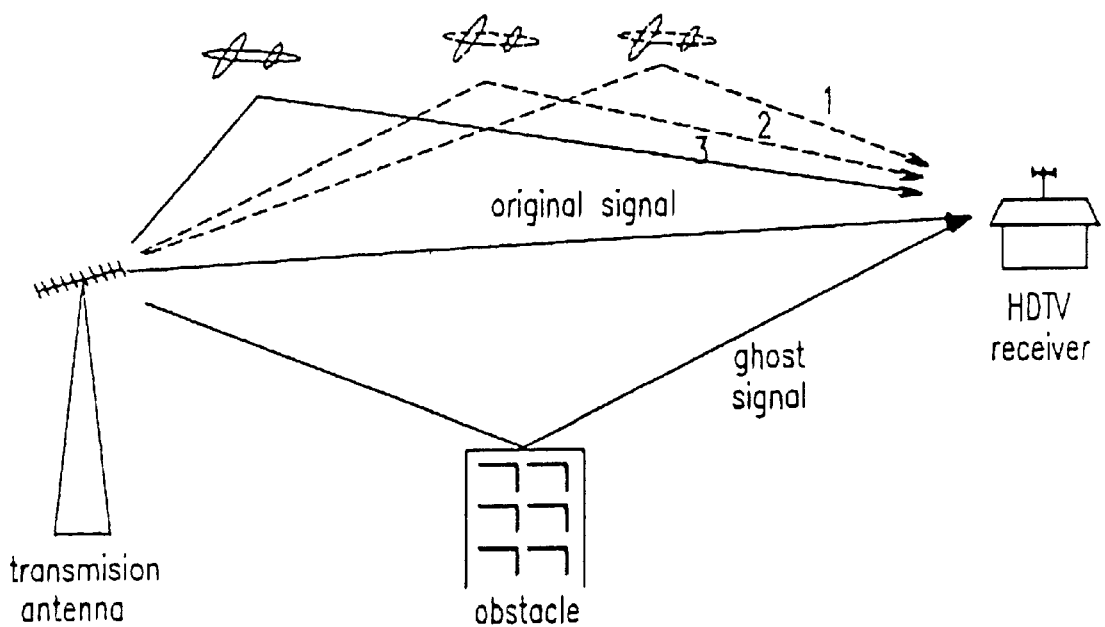
FIG. 4 shows modeling of a general channel having a moving ghost.

However, when the distortion state of the channel varies fast due to the existence of moving ghost as shown in FIG. 4, the distortion information of channel obtained using the first training sequence is changed before channel distortion information obtained using the second training sequence because the training sequence comes once for each field. Thus, application of the obtained channel distortion information obtained using the first sequence to the data following the first training sequence results in an incorrect compensation of data with wrong channel distortion information.

Thus, when the channel state varies fast due to the moving ghost in the channel, the data mode is employed. The data mode uses the data portion as well as the training sequence for equalization to quickly compensate for the channel state being changed. That is, the data mode performs equalization using the training sequence and 8-level slicing. Moreover, the blind mode carries out equalization according to slicing rather than information of the training sequence when there is a possibility of a divergence of the equalizer 206. The present invention employs three slicing modes, 2-level, 4-level and 8-level slicing modes.

For example, when there is no moving ghost in the channel and the equalizer 206 does not diverge, the equalizer 206 is operated in the training sequence mode. When the moving ghost does not exist in the channel but the equalizer 206 diverges, the equalizer 206 is operated in the blind mode. Finally, the equalizer 206 is operated in the data mode when it does not diverge but the moving ghost exists in the channel, and is operated in both the data mode and the blind mode when the moving ghost exists in the channel and the equalizer diverges.

FIGS. 7A to 7D are flow charts showing the operation of the microcomputer 100 for removing the moving ghost existing in the channel through equalization according to the first embodiment of the present invention. First of all, when the power is turned on, a channel change occurs, or the system is reset, an algorithm applied to the present invention is initialized (step (401). Specifically, assuming that there is no moving ghost in the channel, the data mode and the blind mode are cancelled and the step size of the equalizer 206 is set to a minimum. Furthermore, the initial value of a divergence counter used for judging if the equalizer 206 diverges is set to 5, and the initial values of counter_1 and counter_2, which are used for other purposes, are set to 0. In the first embodiment of the present invention, it is assumed that the step size of equalizer 206 has two modes, maximum and minimum.

After the initialization, the synchronizing signal detector 202 detects the data segment synchronizing signal (horizontal synchronizing signal) and field synchronizing signal (vertical synchronizing signal) from the input data, and sends the detected result to the microcomputer 100. That is, the synchronizing signal detector 202 detects the data segment synchronizing signal and the field synchronizing signal from the 10-bit digital data. The synchronizing signal detector 202 then outputs to the microcomputer a signal nSyncLock of '0' when both the two signals are detected and a signal nSyncLock of '1' when both synchronizing signals are not detected.

The microcomputer 100 judges if the signal NSyncLock is '0' (step 402) and, when it is, proceeds to step 404 for determining the existence of moving ghost because '0' means that the data segment synchronizing signal and the field synchronizing signal are all detected. When the signal nSyncLock is judged to be '1', the microcomputer 100 resets the channel decoder 200 and the tuner 101 of FIG. 5 because it means that the synchronizing signals are not detected (step (403). When necessary synchronizing signals are not detected in digital data processing, the following data processing is meaningless. Thus, since the synchronizing signals may not be detected when severe noise exists or the channel decoder 200 is incorrectly set, the channel decoder 200 and the tuner 101 are reset to restart from the beginning.

A detailed explanation of the four cases will be explained below. Namely, the four cases are a case when there is no moving ghost in the channel and the equalizer 206 does not diverge, a case when there is no moving ghost but there is a possibility that the equalizer 206 diverges, a case when the equalizer 206 did not diverge but the moving ghost exists in the channel, and a case when the moving ghost exists and there is a probability that the equalizer 206 diverges.

First, when there is no moving ghost and the equalizer 206 does not diverge, the DC calculator 205 calculates the DC value loaded in the 10-bit digital data and the microcomputer 100 reads this value. Here, the microcomputer 100 increases in value of the counter_1 by one whenever it reads the calculated DC value (step 404). The DC value is stored in the inner memory of the microcomputer 100. This operation is carried out until the value of the counter_1 reaches '15' (step 405). The critical value of 15 is experimentally set and may be changed according to a circuit designer. If the value of the counter_1 is judged to be '15,' a maximum and minimum of the 15 DC values stored in the microcomputer 100 are separately stored in parameters DCmax and DCmin (step 406), and the difference between them, i. e. DCmax–DCmin, is calculated (step 407). It is judged that there is no moving ghost in the channel if DCmax–DCmin <6. This is because the level of moving ghost when DCmax–DCmin <6 can be sufficiently equalized using only the training sequence. The critical value of 6 is also experimentally set and may be changed according to the designer.

When DCmax–DCmin <3 in step 407, it is judged that there is no moving ghost, or only a minute one exists, resetting the value of the counter_2 to '0' (step 409). Here, the critical value of 3 is experimentally set and may be varied according to the designer. The counter_2 is a kind of flag indicating whether a moving ghost exists in the channel. A value of '0' means that there is no moving ghost and '1' means that the moving ghost exists. In the present invention, the moving ghost is judged to exist when DCmax–DCmin≧6, setting the value of the counter_2 to '1' (step 408). When DCmax–DCmin≧3, or <6, the value of the counter_2 is maintained in its current state.

After varying the state of the counter_2, the current value of the counter_2 and the VSB mode of the input data are checked (step 410). If the value of the counter_2 is '1' and the VSB mode of the input data corresponds to a terrestrial 8VSB mode in step 410, the data mode is ON and the step size becomes the maximum (step 411). Otherwise, the data mode is OFF and the step size becomes the minimum (step 412). The VSB mode is checked because the moving ghost exists only in the terrestrial broadcasting channel while the VSB mode includes 8VSB mode used for terrestrial broadcasting and 16VSB mode used for cable broadcasting. That is, when the moving ghost exists in the channel, the step size is increased to follow the variation in the ghost state quickly because the state of ghost changes each moment. On the contrary, the step size is decreased when there is no moving ghost.

Subsequently, the MSE value (MSEOUT) output by the equalizer 206 is checked in order to judge if the equalizer 206 diverges (step 413). That is, the microcomputer 100 judges if the MSE value (MSEOUT) calculated by the output MSE calculator 207 of channel decoder 200 is larger than the signal power of 8VSB (step 414). If the output MSE value of the equalizer 206 is larger than the signal power, the equalizer 206 diverged completely, in which convergence is almost impossible even when equalization is performed in the blind mode. Accordingly, when the output MSE value is judged to exceed the signal power in step 414, the channel decoder 200 is rest to such that the equalizer exists the divergence state quickly (step 415). In other words, the blind mode operates when it is possible for the equalizer to diverge, and it is more effective that the channel decoder 200 is reset to restart from the beginning when the equalizer 206 diverged completely. Alternatively, only the equalizer 206 may be reset rather than resetting the channel decoder when the equalizer 206 diverged completely. This improves the operation speed of the system.

Figure 10:
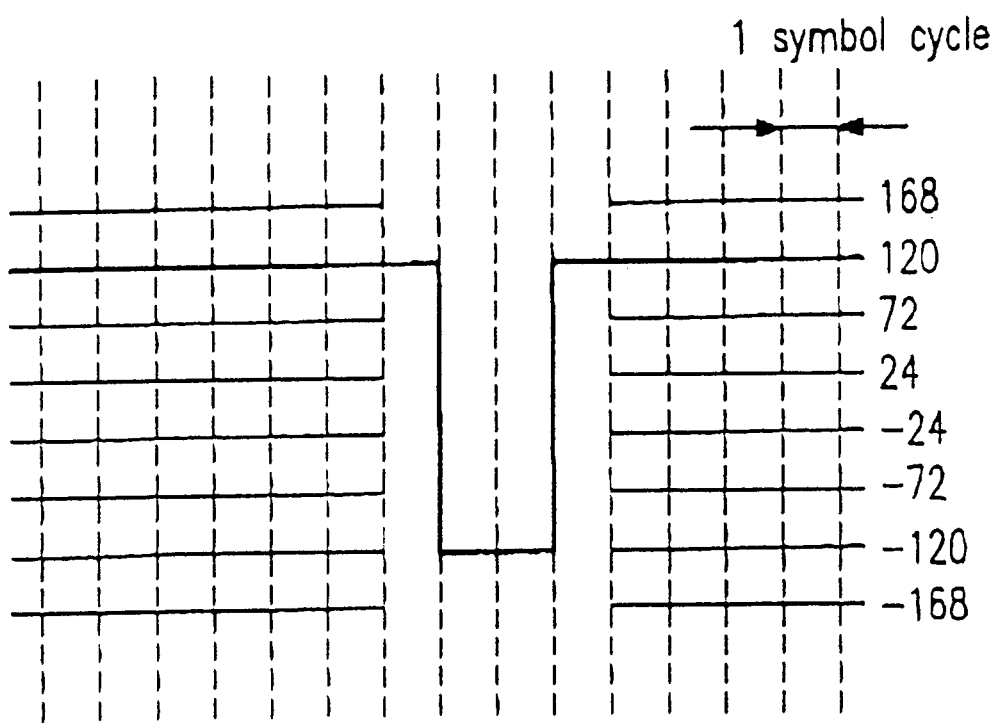
FIG. 10 shows a 8VSB signal in the time domain and process of calculating a signal power using it.

FIG. 10 shows the 8VSB in the time domain, where there is no distortion such as noise and ghost. In the ADC 201 used in the embodiment of the present invention, it is assumed that 168, 120, 72, 24, −24, −72, −120 and −168 are assigned to the 8 levels of FIG. 10. From the assigned values, the signal poser of 8VSB signal in an idea case, i.e. when there is no distortion, can be obtained according to the following Equation (1).

$$\text{Signal power} = \frac{(168)^2 + (120)^2 + (72)^2 + (24)^2}{4} = 12096 \quad (1)$$

For example, when the equalizer 206 is completely diverted, The MSE value after equalization becomes large than 12096. Accordingly, the present invention determines whether equalization is carried out in the blind mode or not when the output MSE of the equalizer 206 does not exceed the signal power. When the output MSE value (MSEOUT) is judged to be less than the signal power in step 414, it is decided if this value is larger than a critical value (step 416). Here, the critical value judges if the equalizer 206 diverges and may be experimentally determined by the designer.

A judgement that the equalizer 206 may be diverged is made if the output MSE (MSEOUT) of the equalizer 206 exceeds the critical value, and there is a high probability that the equalizer 206 converges, otherwise. Accordingly, when the output MSE value of the equalizer 206 is less than the critical value in step 416, the value of a divergence counter which checks the divergence of the equalizer 206 becomes 5 (step 424). The value of the divergence counter can also be set by the designer. Then, a judgement is made whether the data mode is OFF (step 425), and the process returns to step 402 to repeat the aforementioned procedure when the data mode is OFF in step 425.

In the second case, the moving ghost does not exist in the channel but the equalizer 206 diverges due to noises other than the moving ghost, for example additive white Gaussian noise (AWGN). In such case, if the output MSE value of equalizer 206 is decided larger than the critical value in step 416, the value of the divergence counter is decreased by one (step 417), and its current value is checked (step 418). The blind mode is ON when the value of the divergence counter is not '0', which means a great possibility of divergence. However, the blind mode is cancelled and simultaneously, the value of the divergence counter becomes '5' when the value of the divergence counter corresponds to '0' (step 419). That is, when it is judged that equalizer 206 diverged once, the equalizer 206 is operated five times in the blind mode to improve reliability. As a result, the equalizer 206 operates in the blind mode unless the value of the divergence counter is '0' in step 418. For this, the step size of equalizer 206 becomes the maximum (Max) to allow it to converge quickly (step 420), and then a 2-level slicing is executed (step 421).

Figure 8:
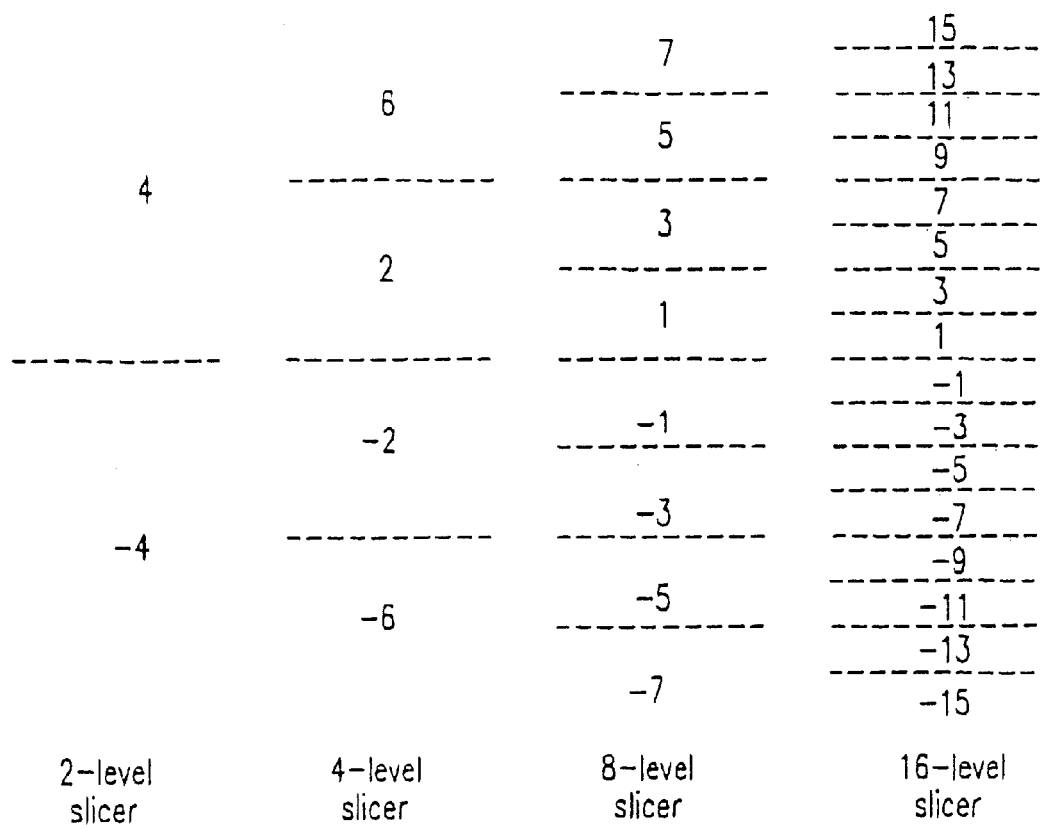
FIGS. 8A to 8D show different levels in the slicer of FIG. 6.

After the 2-level slicing, a 4-level slicing is carried out (step 422), followed by a 8-level slicing step (step 423). Here, the interval between the 2-level and 4-level slicings and between the 4-level and 8-level slicings may be determined by the designer. Preferably, the interval is set to approximately 24.2 ms. Referring back to FIG. 6, the slicer 312 consists of 2-level, 4-level, 8-level and 16-level slicers. As shown in FIGS. 8A to 8D, the 2, 4, 8 or 16-level slicing is executed according to a slicing mode. The 16-level slicer of FIG. 8D is used for cable broadcasting and not for terrestrial broadcasting.

Figure 9:
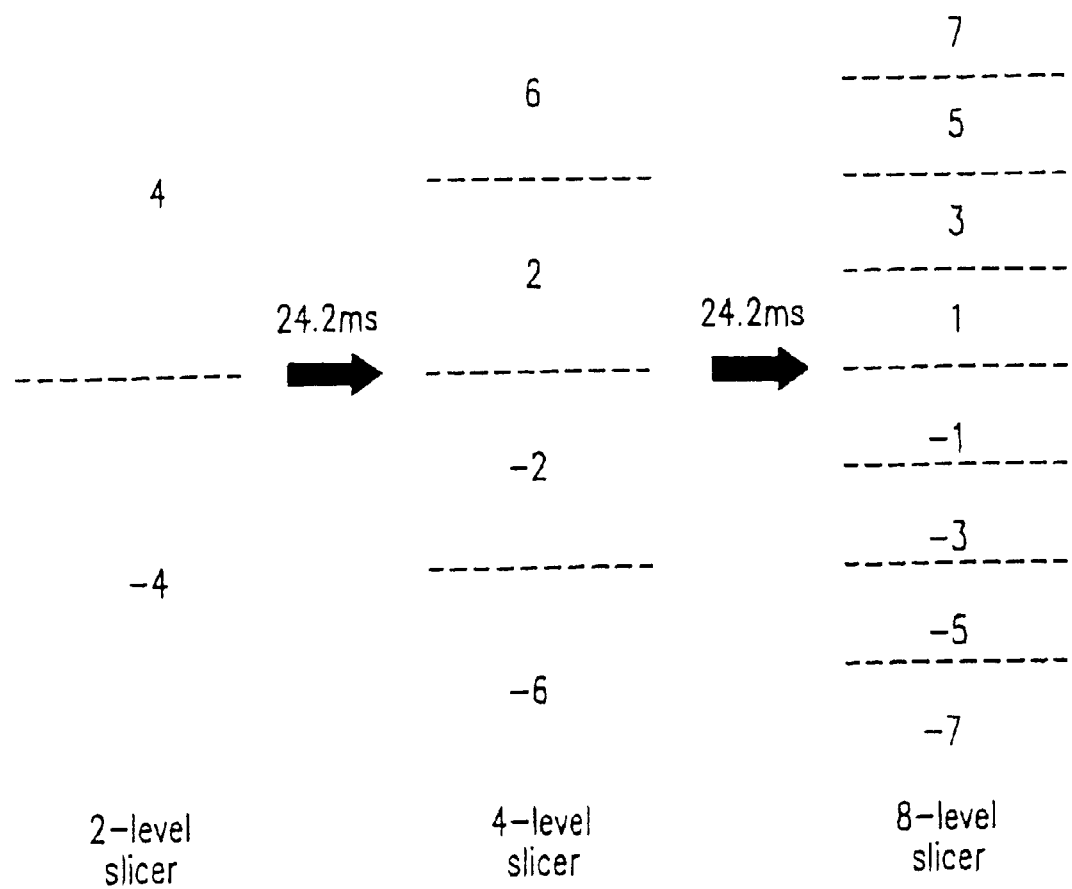
FIGS. 9A to 9C show the blind equalization of FIG. 6.

FIGS. 9A and 9C show the blind equalization according to the present invention. The 2-level slicing is performed for 24.2 ms (field synchronizing section) as shown in FIG. 9A, followed by the 4-level slicing for 24.2 ms as shown in FIG. 9B, and by the 8-level slicing as shown in FIG. 9C. An error detector 315 calculates the difference between decision data obtained by slicing the data output by the equalizer 206 according to the slice mode selected by a select signal of multiplexer 314 and the output data of the equalizer. The feedforward filter 301 and feedback filter 307 then perform equalization employing the difference as an error signal. Upon completion of the successive 2-level, 4-level and 8-level slidings, the process returns to step 402, repeating the same loop.

The third case is when the equalizer 206 did not diverge but the moving ghost exists in the channel. When the difference between the maximum (DCmax) and minimum (DCmin) of the DC value, which were read fifteen times in step 407, is larger than '6' (DCmax−DCmin≧6), it is judged that the moving ghost exists in the channel, setting the value of the counter_2 to '1' (step 408). When the counter_2 is set to a value of '1' and the mode corresponds to 8VSB (step 410), the data modes is ON and simultaneously, the step size of equalizer 206 becomes the maximum (step 411). Thereafter, the output MSE value (MSEOUT) of the equalizer 206 is read in order to check if the equalizer 206 diverges (step 413). An explanation when the equalizer may have diverged or completely diverged will be omitted as it has already been described above.

That is, when the read output MSE value of the equalizer 206 is less than the signal power (step 414) and less than the critical value (step 416), it is judged that there is a possibility that equalizer 206 converges, making the value of the divergence counter '5' (step 424). Then, it is checked if the data mode is OFF (step 423), and when the data mode is ON, the input MSE and output MSE of the equalizer 206 are read and compared with each other in order to judge whether the data mode being in the on state is appropriate. Since the equalizer 206 amplifies the nose when it operates in the data mode more than in the training sequence mode, turning on the data mode may amplify the noise rather than remove the moving ghost in the channel, affecting the equalizer 206.

Accordingly, after the data mode is ON, the input MSE (MSEIN) and outpu MSE (MSEOUT) of the equalizer 206 are read (step 426), and stored in parameters ErrIn and ErrOUT1 within the microcomputer 100, respectively (step 427). Then, the difference (ErrOUT1−ErrIN) between the two values is compared with '0' (step 428). When the difference exceeds '0', i.e. the output MSE value is larger than the input MSE value, the data mode which was previously turned on is turned off (step 429) because the effect or amplifying the noise is greater than the effect of removing the ghost when the data mode is ON. If the output MSE value is not larger than the input MSE value, the process returns to step 402 to repeat the same procedure, while maintaining the ON state of the data mode.

When the data mode is OFF in step 429, the output MSE value of the equalizer 206 is read once more to be stored in a parameter ErrOUT2 in the microcomputer 100 in order to judge whether turning off the data mode would be appropriate (step 430), and then compared with the value stored in parameter ErrOUT1, which was read when the data mode was ON in step 427 (step 431). When the value of ErrOUT2 is larger than the value of ErrOUT1, i.e. when the output MSE value of the equalizer 206 after turning off the data mode exceeds its output MSE value when the data mode was ON, the data mode is turned on again (step 423). The fact that the output MSE value (ErrOUT2) after turning off the data mode is larger than the output MSE value (ErrOUT1) means that turning off the data mode improves the effect of amplifying the noise rather than removing the ghost.

If the output MSE value (ErrOUT2) of the equalizer 206 after turning off the data mode is smaller than its output MSE value (ErrOUT1) when the data mode was ON, the process returns to step 402 to repeat the same procedure, maintaining the data mode in the OFF state. This is for the purpose of setting the mode of the equalizer 206 to allow the output MSE value to be as small as possible although the output MSE value of the equalizer is larger than its input MSE when both the data mode is turned on and turned off.

The fourth case is when the moving ghost exists in the channel and the equalizer 206 diverges, and is the worst case. Thus, the data mode is ON and simultaneously, the blind mode is performed. The operation in this case is similar to that in the aforementioned case when the moving ghost does not exist but the equalizer diverges, except that the difference, DCmax–DCmin, is judged to be more than '6' to turn on the data mode. That is, when the value of DCmax–DCmin corresponds to '6' in step 407, this means an existence of the moving ghost in the channel. Thus, the value of the counter_2 is set to '1' in step 408. In step 410, when the value of the counter_2 is '1' and the VSB mode of input data corresponds to the terrestrial 8VSB, the data mode is ON and the step size becomes the maximum (Max) (step 411).

Then, the MSE of the output of the equalizer 206 is checked to decide if the equalizer 206 diverges (step 413). The microcomputer 100 reads the MSE value (MSEOUT) calculated by the output MSE calculator 207 of the channel decoder 200 and judges if it is larger than the signal power of 8VSB (step 414). When the value (MSEOUT) is larger than the signal power, the equalizer 26 is completely diverged. Thus, the channel decoder 200 or the equalizer 206 is reset to restart the ghost removal procedure. On the contrary, when the value (MSEOUT) does not exceed the signal power, the equalizer 206 did not diverge yet. Thus, the value (MSEOUT) is compared with the critical value again, checking the possibility of divergence (step 416). Here, the critical value decides if the equalizer 206 diverges and may be experimentally determined by the designer.

The possibility of divergence of the equalizer 206 can be judged to be high if the output MSE value (MSEOUT) of the equalizer 206 is larger than the critical value, and the possibility of convergence of equalizer 206 can be judged to be high, otherwise. Accordingly, when the output MSE value of the equalizer 206 is larger than the critical value in step 416, the value of the divergence counter is decreased by one (step 417), and then the current value of the divergence counter is checked (step 418). The blind mode is turned on when the value of the divergence counter does not correspond to '0', but it is cancelled and simultaneously, the value of the divergence counter is set to '5' when the value is '0' (step 419).

As a result, the equalizer 206 operates in the blind mode when the value of the divergence counter is not equal to '0' in step 418. For this, the step size of the equalizer 206 is required to become the maximum, to allow it to converge quickly (step 420), and then the 2-level slicing is performed (step 421). After the execution of the 2-level slicing, the 4-level slicing is carried out (step 422), followed by the 8-level slicing (step 423). Upon the completion of 2, 4 and 8-level slicings, the process returns to step 402, repeating the same loop. According to the aforementioned method, the equalizer can stably operate as fast as possible even when it diverges as well as when the moving ghost exists in the channel.

Figure 11A:
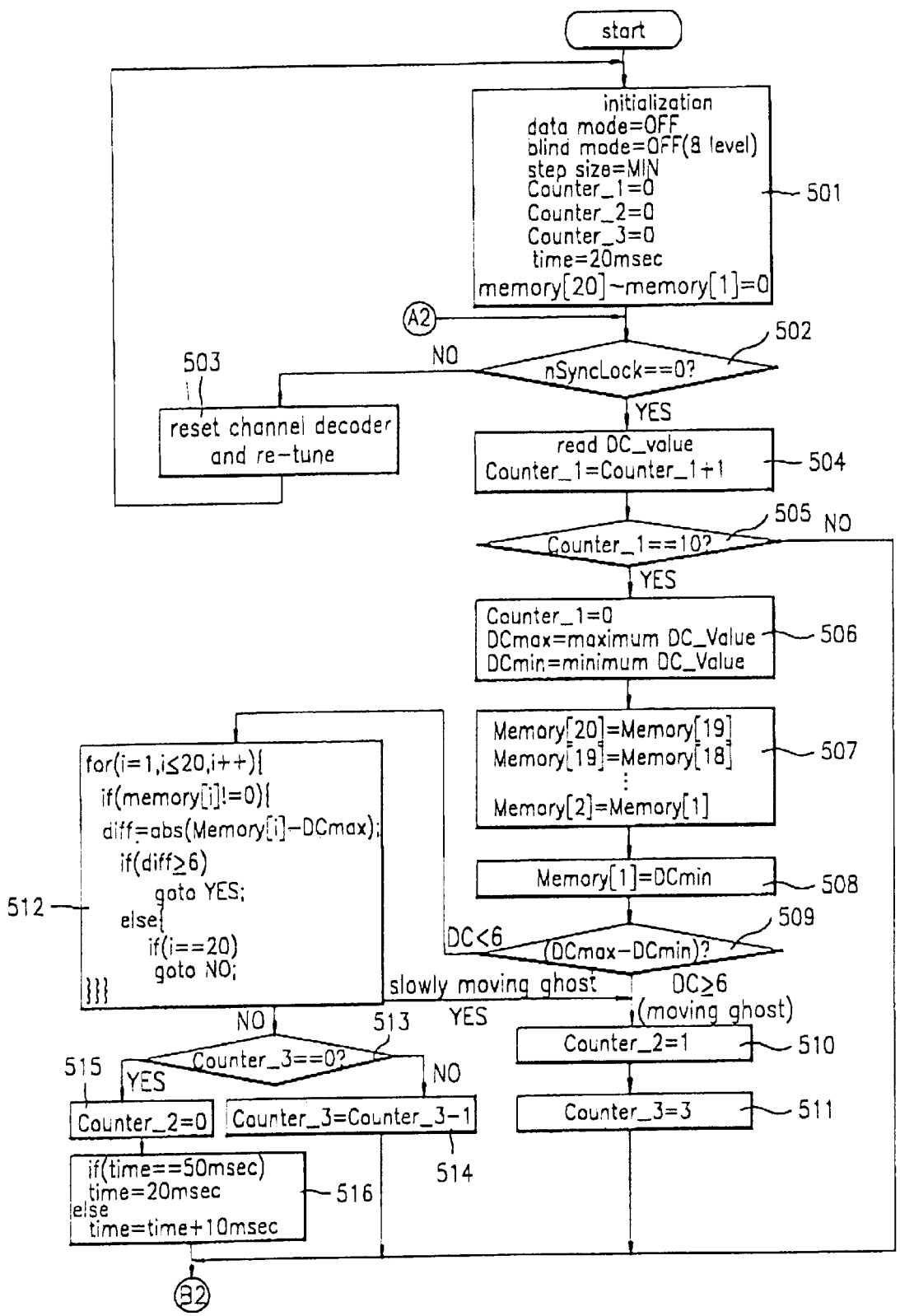
FIGS. 11A and 11B are flow charts showing a method for compensating channel distortion according to a second embodiment of the present invention.
Figure 11B:
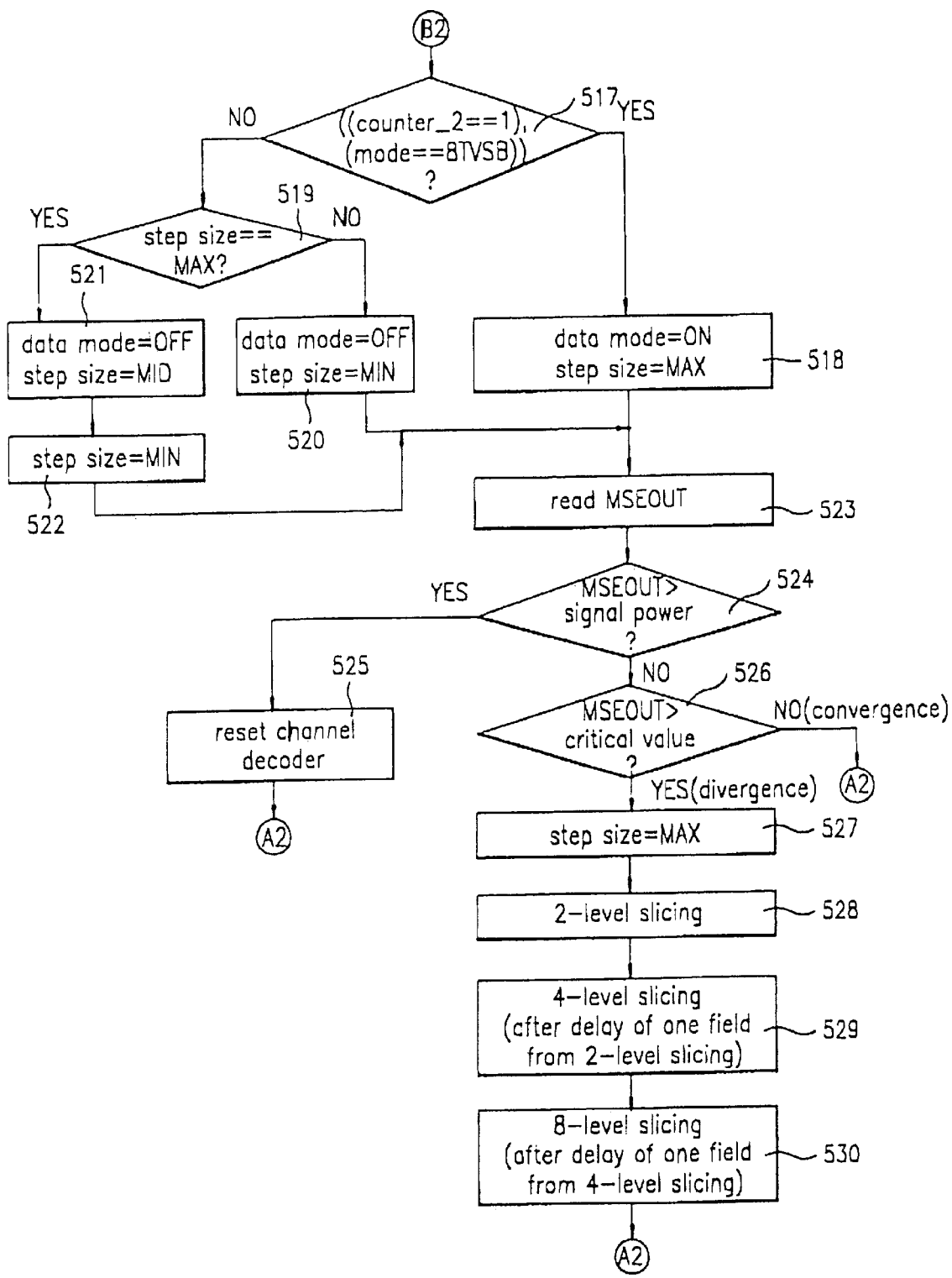
Figure 12A:
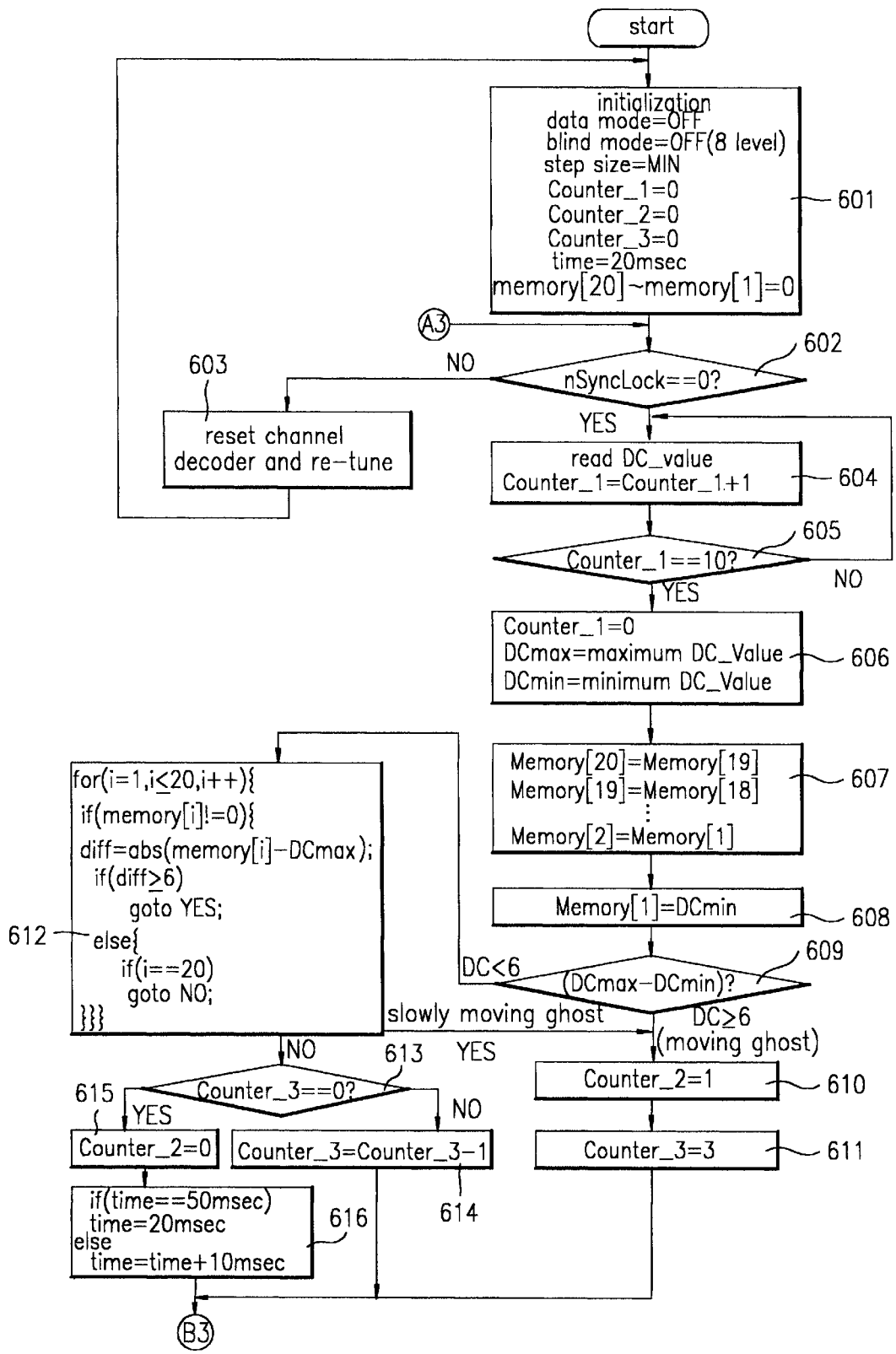
FIGS. 12A and 12B are flow charts showing a method for compensating channel distortion according to a third embodiment of the present invention.
Figure 12B:
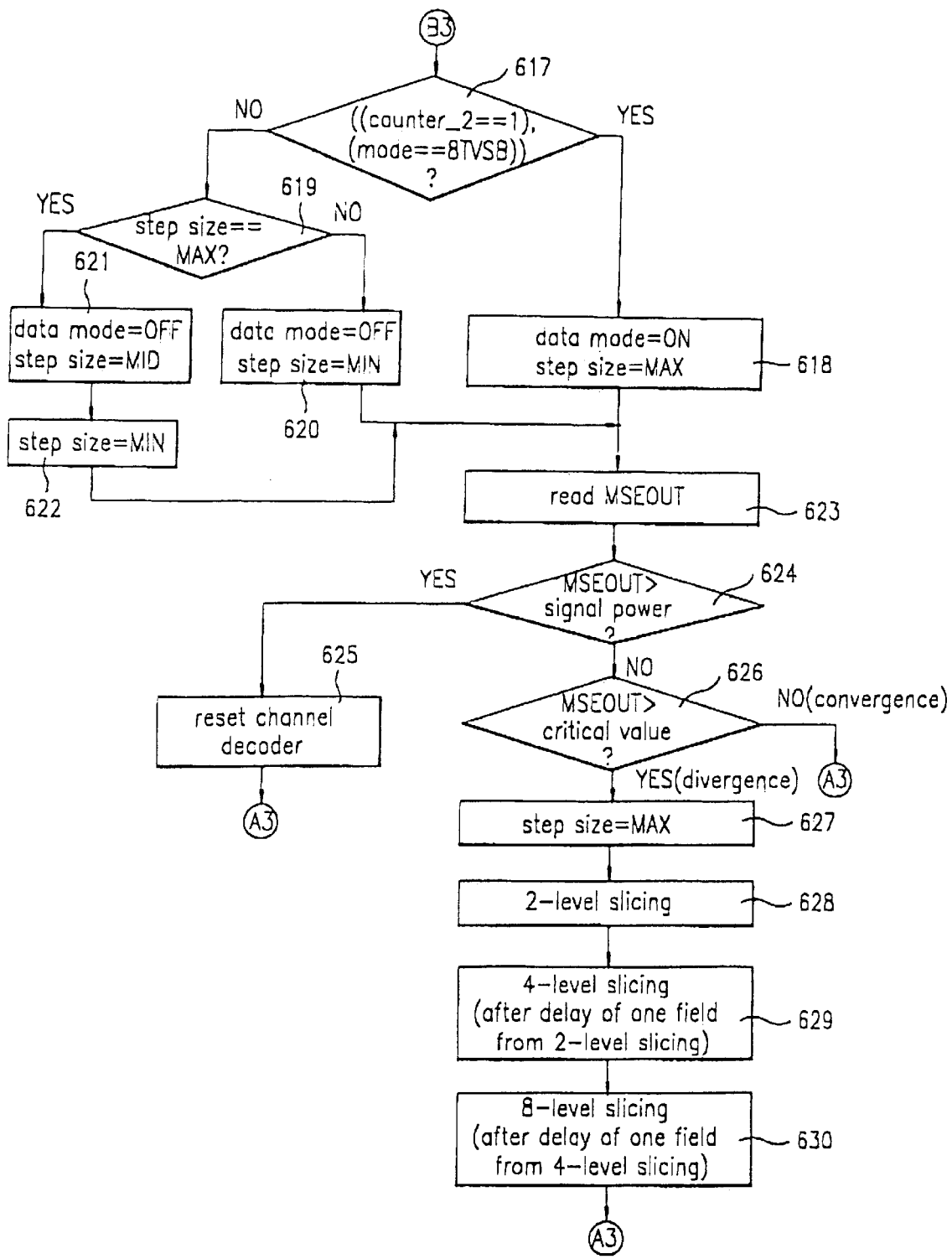
Figure 13A:
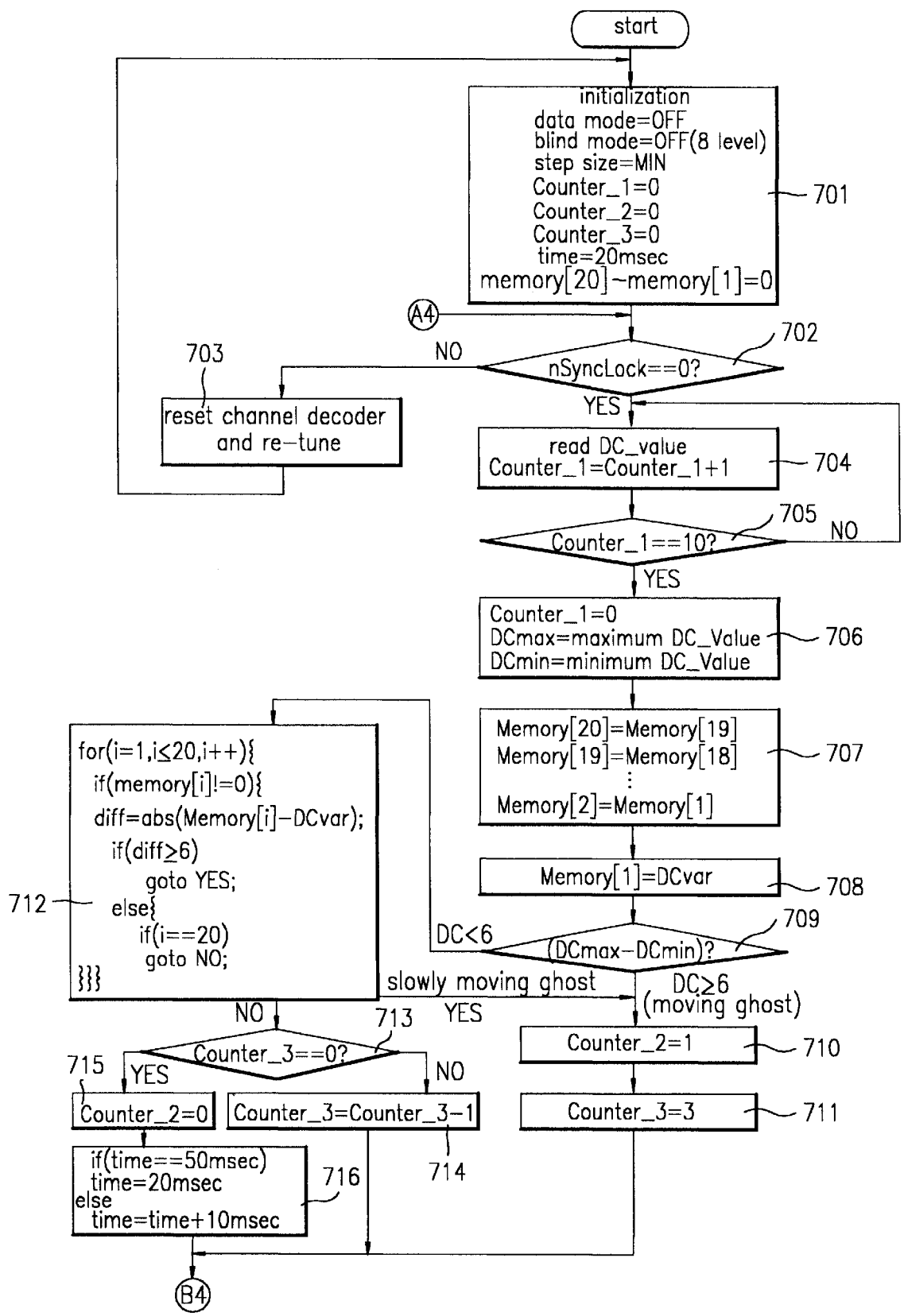
FIGS. 13A and 13B are flow charts showing a method for compensating channel distortion according to a fourth embodiment of the present invention.
Figure 13B:
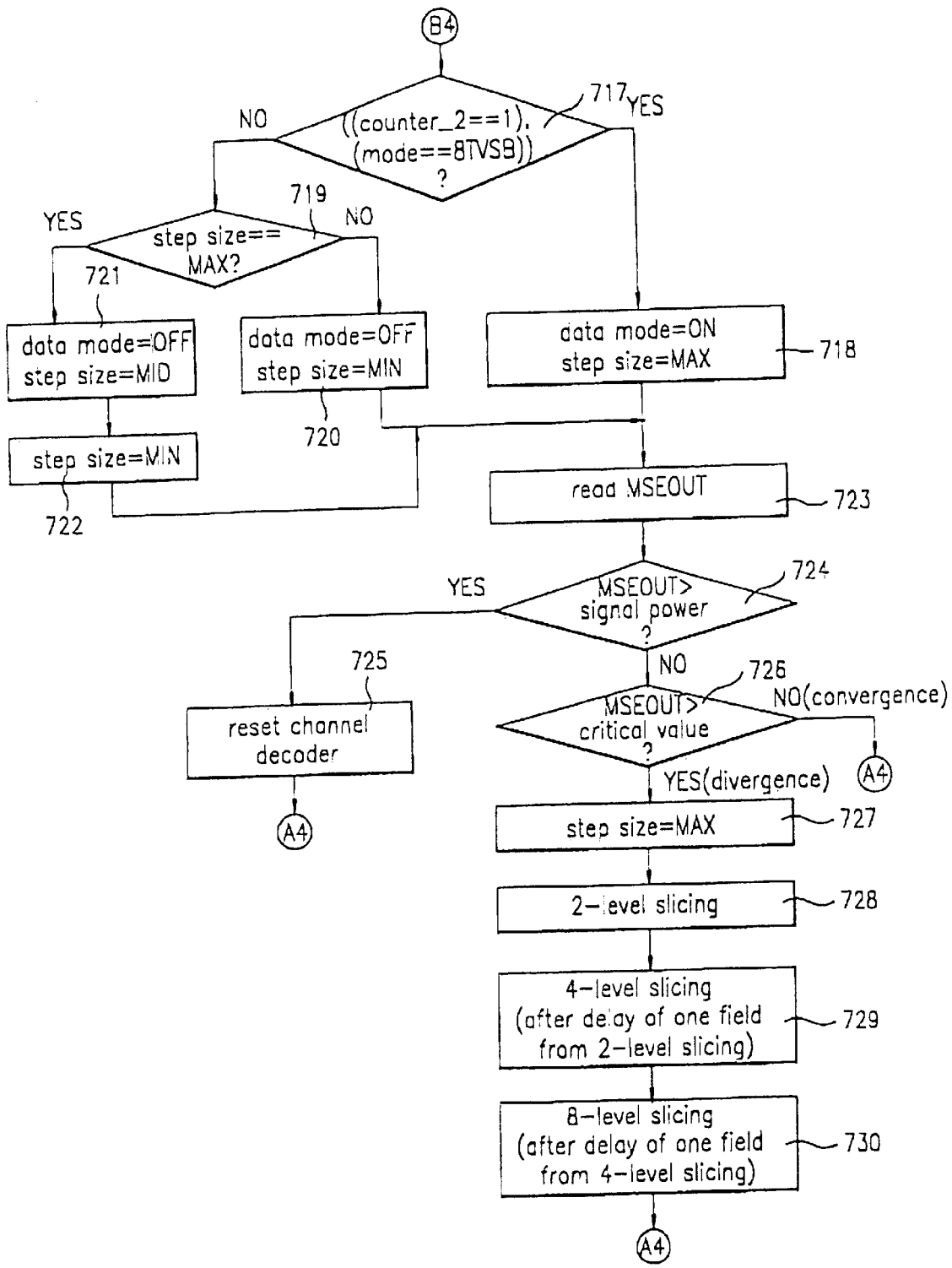

FIGS. 11, 12 and 13 show other embodiments of the present invention, which not only effectively and quickly remove moving ghost existing in the channel but also removes ghost which moves very slowly. In these embodiments, the divergence counter is not employed for simplification of the process. FIGS. 11A and 11B show the second embodiment of the present invention, FIGS. 12A and 12B show the third embodiment of the present invention, and FIGS. 13A and 13B show the fourth embodiment of the present invention.

Specifically, equalization is performed in the blind mode directly when the MSE value (MSEOUT) calculated by the output MSE calculator 207 is larger than a critical value. The equalization is carried out in the data mode without delay when the MSE value is equal to or less than the critical value. Referring to FIGS. 11A and 11B, when the power is turned on, a channel conversion occurs, or the system is reset, the portion of algorithm to which the present invention is applied is initialized (step 501). The data mode and blind mode are cancelled on the assumption that the moving ghost does not exist in the channel, and the step size of the equalizer 206 is set to the minimum (Min). The initial values of the counter_1, counter_2 and counter_3, used for judging if the moving ghost exists, are set to '0'. Furthermore, the time is set to 20 msec, and the initial value of memory (memory[20]–memory[1]) is set to '0'.

Upon the completion of initialization, the microcomputer 100 judges if the signal nSyncLock output from the synchronizing signal detector 202 is '0' (step 502). When it corresponds to '0', meaning that both the data segment synchronizing signal and field synchronizing signal are detected, the process goes to step 504 for checking if the moving ghost exists. When the signal nSyncLock is '1', meaning that the synchronizing signals are not detected, the channel decoder 200 and the tuner 101 of FIG. 5 are reset, to restart the process from the beginning (Step 503). Similar to the first embodiment, this operation is performed on assumption that a signal nSyncLock of '0' is generated when the synchronizing signal detector 202 detects both the data segment synchronizing signal and field synchronizing signal, and a signal nSyncLock of '1' is generated otherwise.

When the signal nSyncLock is judged to be '0' in step 502, the DC calculator 205 calculates the DC value loaded in the 10-bit digital data, and the microcomputer 100 reads this value. The microcomputer 100 increases the value of the counter_1 by one whenever it reads the DC value (step 504). The DC values read by the microcomputer are stored in the memory inside microcomputer 100 until the value of the counter_1 reaches '10' (Step 505). The counter_1 indicates the number of times of the DC value is read by the microcomputer 100 and its value increases by one whenever the microcomputer reads the DC value. Although '10' is used as the maximum in this embodiment, the threshold value can be arbitrarily determined differently by the designer.

When the value of the counter_1 does not correspond to '10', the process directly goes to step 517 which judges if the moving ghost exists. This is for the purpose of stably operating the system by checking if the equalizer 206 diverged even though it cannot be correctly judged if the moving ghost exists because the microcomputer 100 did not read the DC value from DC calculator 205 ten times. When the value of the counter_1 is judged to be '10', the value is reset to '0', and the maximum value (maximum DC_Value) and the minimum value (minimum DC_Value) of the ten DC values stored in the inner memory of microcomputer 100 are separately stored in parameters DCmax and DCmin (step 506). Thereafter, each of the twenty memory values set in initialization step 501 shifts to the next memory (step 507). That is, the value of memory[19] shifts to the memory [20], the value of memory[18] shifts to the memory[19] and so on. Upon the completion of shifting the twenty memory values, the memory[1] stores the minimum value (DCmin) detected in step 508.

The values stored in the memories are used for detecting the moving ghost having a small variation in the DC value with the lapse of time, i.e. slowly moving ghost. The present invention can detect even the slowly moving ghost even though it is easily judged that the slowly moving ghost does not exist because of the small variation in the DC value with the lapse of time. Accordingly, the system can operate optimally according to channel state. At this time, the value of DCmax−DCmin is calculated to detect the fast moving ghost before the detection of slowly moving ghost using the memories (step 509). When DCmax−DCmin≧6 in step 509, the moving ghost is judged to exist in the channel, changing the value of the counter_2 to '1' (step 510). The counter_2 is a kind of flag indicating the existence of the moving ghost in the channel, a value of '0' meaning that there is no moving ghost in the channel and a value of '1' meaning that the moving ghost exists. The reference value 6 is experimentally determined and can be changed by the designer.

After the value of the counter_2 is changed to '1', the value of the counter_3 is set to '3' (step 511). The counter_3 makes the system judge that the moving ghost, which had appeared in the channel, disappear when the value of DCmax−DCmin becomes smaller than '6' three successive times, rather than judging that there is no moving ghost in the channel when the value becomes smaller than '6' followed by DCmax−DCmin≧6. Even though the moving ghost exists in the channel, the value of DCmax−DCmin may be smaller than '6'. Thus, if it is judged that there is no moving ghost in the channel because the value of DCmax−DCmin becomes smaller than '6' once while the moving ghost exists, to thereby cancel the data mode, the received image becomes poor. On the contrary, when the data mode is maintained in the ON state for a while after the moving ghost disappears, the image is received without deterioration in its quality. This is the reason why the counter_3 is employed. The reference value of 3 of the counter_3 may be arbitrarily varied by the designer.

Meantime, it may be judged that there is no moving ghost in the channel when DCmax−DCmin<6 in step 509. In this case, however, the slowly moving ghost can exist in the channel. Accordingly, it is judged if there is the moving ghost that moves very slowly in the channel before the data mode is cancelled (step 512). Specifically, the values of the memory[20]−memory[1] which stored the minimum values, DCmin, are compared with the currently read maximum value, DCmax, whenever the microcomputer 100 reads the DC value ten times because the difference between the DC values that the microcomputer 100 read ten times cannot judge the moving ghost that moves very slowly. Here, the memory[20]−memory[1] store the minimum values of the DC values, which are detected by the DC calculator 205 and read by the microcomputer 100 ten times.

Back to step 501, the time is initialized to 20 msec. This is to allow the microcomputer 100 to read the DC value from the DC calculator 205 in cycle of 20 msec. This value can be arbitrarily determined by the designer. Since the minimum value of the DC values that the microcomputer 200 read ten times by 20 msec was stored in the memory[1] after the values of the memory[20]−memory[1] shift, it can be known that the values stored in the memory[20]]−memory [1] are the minimum values which were read twenty times in cycle of 200 msec and stored therein. Accordingly, the variation in the DC value on the channel for the period of 200 msec×20=4000 msec (4 seconds approximately) can be obtained using the values stored in the memory[20]−memory[1]. Although the number of the memories are twenty in the embodiment of present invention, it can be also varied by the designer.

When the DCmax value currently read and detected is sequentially compared with the values of the memory[20]−memory[1] previously stored therein, and the difference between them is larger than '6', it is decided that there exists the moving ghost which changes the DC value slowly even if DCmax−DCmin<6 in step 509. On the contrary, it is not judged that the moving ghost does not exist in the channel until the difference becomes smaller than '6'. In diff=abs (memory[i]−DCmax) of step 512, abs means that the absolute value is taken. The reason why the absolute value is obtained is that the currently detected DCmax value may be smaller than the values stored in the memory[20]−memory [1]. Accordingly, when the value of diff is larger than '6' in step 512, it is decided that there is the moving ghost which moves very slowly, to set the value of the counter_2 to '1' (step 510), setting the value of the counter_3 to 3 (step 511).

Even though the currently detected DCmax value was compared with all the values stored in the memory[20]−memory[1] in step 512, when the difference between them is smaller than '6', it is judged if the value of the counter_3 corresponds to '0' (step 513). This is for the purpose of keeping the data mode in the ON state, resulting from the judgement that the moving ghost exists in the channel, for a while, instead of cancelling it, even when the difference between the DCmax and DCmin is smaller than '6' and the difference between the DCmax and the values stored in the memory[20]−memory[1] is also less than '6'.

Accordingly, when the value of the counter_3 does not correspond to '0', this value is decreased by 1 and the next routine is performed (step 514). When the value is '0', it is decided that there is no moving ghost in the channel, resetting the counter_2 to '0' (step 515). After resetting the counter_2 to '0' in step 515, the time of 20 msec, that is set in the initialization step 501, is changed (step 516). Though the value of time is selected form 20 msec, 30 msec, 40 msec and 50 msec in the present invention, it can be arbitrarily changed by the designer. Here, the value of time corresponds to the cycle by which the microcomputer 100 reads the DC value calculated by DC calculator 205. In other words, when it is decided that there is no moving ghost in the channel from the judgement if the moving ghost exists using the DC value read by 20 msec, the value of time is changed to 30 msec so that microcomputer 100 reads the DC value from DC calculator 205 by 30 msec, to judge if there exists the moving ghost. Through this method, the DC values is read with varying the value of time up to 50 msec, to thereby check the existence of moving ghost.

The variation in the value of the time helps detect the moving ghost which moves slowly in step 512. If the value of the time is 50 msec, the microcomputer 100 reads the DC value ten times by 50 msec and repeats the operation if storing the minimum value of them in the memory[1]. Accordingly, the values stored in the memory[20]−memory [1] correspond to the minimum values that are read twenty times by 500 msec and stored therein because they are the minimum values of the DC values, which are read by the microcomputer 100 ten times by 50 msec and then stored in the memory[1] after each of the values of the memory[20]−memory[1] shifts to the next memory. As a result, it can be known the variation in the DC value on the channel for 500 nsec×20=10000 msec (ten seconds approximately) using the values stored in the memory[20]–memory[1]. As described above, a DC variation in the channel exists, which corresponds to four seconds approximately when the value of time is 20 msec, and then seconds approximately when the time is 50 msec. This means that the moving ghost that moves more slowly can be detected when the time is 50 msec rather than 20 msec.

Upon the execution of one of steps 505, 511, 514 and 516, the current value of the counter_2 and the VSB mode of data input to the VSB mode detector 203 are checked (step 517). When the value of the counter_2 is equal to '1' and the VSB mode of the data corresponds to terrestrial 8VSB(= 8TVSB), meaning the moving ghost exists in the channel, the data mode is turned on and the step size of the equalizer 206 becomes the maximum (Max) (step 518). That is, since the state of the moving ghost changes every moment when it exists in the channel, the data mode is turned on to use the data portion as well as the training sequence for equalization and simultaneously, the step size of the equalizer becomes the maximum to quickly follow the variation in the ghost.

However, when any of the two conditions in step 517 is not satisfied, it is judged if the step size is the maximum (step 519). This corresponds to a case when there was no moving ghost from the beginning or a case when the moving ghost existed but no longer exists in the current channel. When the current step size of the equalizer 206 has the maximum value in step 519, it means that the moving ghost existed in the channel but no longer exists in the channel, or the equalizer 206 performed the blind mode. This is because the above two cases make the step size to the maximum. Furthermore, when the step size is not the maximum, it means that there was no moving ghost from the beginning, or the channel decoder 200 was reset. Accordingly, when it is decided that the step size is not the maximum in step 519, the data mode is cancelled and the step size becomes the minimum (step 520).

When it is judged that the step size is the maximum in step 519, which corresponds to the case that there is no moving ghost, the data mode is cancelled and simultaneously, the step size becomes the middle value (Min) instead of the minimum (step 521). Then, the step size is changed to the minimum after a lapse of a predetermined time (step 522). This operation is called a gear shift. The converging time of the equalizer can be reduced more when the step size is varied from the maximum through the middle value to the minimum rather than changing from the maximum to the minimum directly.

Upon the execution of one of steps 518, 520 and 522, the MSE value of the output by the equalizer 206 is checked in order to judge if the equalizer 206 diverges (step 523). That is, the microcomputer 100 checks of the MSE value (MSEOUT) calculated by the output MSE calculator 207 of the channel decoder 200 is larger than the signal power of 8VSB (step 524). Here, the output MSE value of equalizer 206 becomes larger than the signal power when it completely diverged. In this case, the convergence of equalizer 206 is almost impossible even if the equalization is performed in the blind mode. Accordingly, when it is judged that the output MSE value exceeds the signal power, the channel decoder 200 is reset such that the equalizer 206 exits out of the divergence state quickly (step 525). In step 525, only the equalizer 206 can be reset to bring about the effect similar to the case where the channel decoder is reset, and improves the operation speed of the system.

In other words, the blind mode is operated when there is a possibility that the equalizer diverges, and the channel decoder 200 or the equalizer 206 is reset to restart the process from the beginning when the equalizer 206 completely diverged. Accordingly, it is determined if the equalization is performed in the blind mode when the output MSE value of the equalizer 206 is not larger than the signal power. Specifically, when the output MSE value (MSEOUT) is smaller than the signal power in step 524, it is judged if the output MSE value is larger than a critical value (step 526). Here, the critical value decides if the equalizer 206 diverges and is determined by the designer. It is judged that there is a possibility that the equalizer 206 diverges if the output MSE value of the equalizer 206 is larger than the critical value, and judged that there is a high possibility that it converges if it is smaller. Accordingly, the blind mode is not executed when the output MSE value of the equalizer 206 is smaller than the critical value in step 526, returning to step 502 and repeating the process.

Meantime, when the output MSE value of the equalizer 206 is larger than the critical value in step 526, the equalizer 206 is operated in the blind mode, allowing the system to return to its stable state quickly. For this, the step size of the equalizer 206 becomes the maximum to make the equalizer 206 converge fast (step 527), and then the 2-level slicing is carried out (step 528). After the 2-level slicing, the 4-level slicing is performed, followed by the 8-level slicing (Step 530). Upon the completion of the 2, 4 and 8-level slicings, the process returns to step 502 again, repeating the same loop.

FIGS. 12A and 12B show the third embodiment of the present invention. Only portions of FIG. 12A, which are different from FIG. 11A, will be described below. Referring to FIGS. 11A and 11B, the process goes to the step of judging if the moving ghost exists when the value of the counter_1 which indicates how many times the microcomputer 100 reads the DC value from DC calculator 205 does not correspond to '10'. In FIG. 12A, however, the process returns to step 604 to repeat the operation of reading the DC value until the value of the counter_1 becomes '10' when the microcomputer 100 did not read the DC value ten times, i.e. when Counter_1≠10. According to an experimental result obtained by realizing the algorithm of FIGS. 11A, 11B, 12A and 12B, the performance of the system by the process of FIGS. 11A and 11B is similar to that by the operation of FIGS. 12A and 12B.

FIGS. 13A and 13B show the fourth embodiment of the present invention. Only portions of FIGS. 13A and 13B, which are different from FIGS. 11A and 11B, will be described below. There may be various methods for storing values in the memory[20]–memory[1]. In FIG. 11A, the minimum values of the DC values read by the microcomputer 100 ten times is stored in the memory[20]–memory[1]. In FIG. 13A, however, the average value of the DC values read by microcomputer 100 ten times is stored in the memories. For this, when the value of the counter_1 corresponds to '10' in step 705, this value is reset to '0', and then the maximum value (maximum DC_Value) and minimum value (minimum DC_Value) of the ten DC values stored in within the memory of the microcomputer 100 are separately stored in parameters DCmax and DCmin while the average value of them is stored in a parameter DCvar (step 706).

Thereafter, the twenty memory value set in initialization step 701 shift one by one (step 707). That is, the value of the memory[19] shifts to the memory[20], the value of the memory[18] shifts to the memory[19]], and so on. After all the twenty values are moved, the memory[1] stores the average value (DCvar) obtained in step 706 (step 708). The value of DCmax−DCmin is calculated to detect the moving ghost (step 708). Specifically, when DCmax−DCmin≧6 in step 709, the moving ghost is judged to exist in the channel, changing the value of the counter_2 to '1' and setting the value of the counter_3 to '3' (step 711). On the other hand, when DCmax−DCmin<6 in step 709, it is judged if there is the moving ghost that moves very slowly before the data mode is cancelled (step 712).

In other words, the average value stored in the memory [20]-memory[1] is compared with the average value currently read and calculated, whenever the microcomputer 100 reads the DC value ten times. It is decided that the moving ghost which slowly changes the DC value exists in the channel even if DCmax−DCmin<6 in step 709 when the difference between the current read average value (DCvar) and the values previously stored in the memory[20]-memory[1] becomes larger than '6' at least once. It is not judged that the moving ghost does not exist in the channel until the difference becomes smaller than '6'. Accordingly, when the value of difference of step 712 is larger than '6', it is decided that there is the moving ghost that moves very slowly, setting the value of the counter_2 to '1' and setting the value of the counter_3 to '3' (step 711). Meantime, when the difference between the average value (DCvar) currently obtained in step 712 and the values stored in the memory[20]-memory[1] is less than '6', it is judged if the value of the counter_3 is '0' (step 713). The explanation of the following operations are omitted because it is identical to that shown in FIGS. 11A and 11B.

As described above, according to the method and apparatus for compensating for channel distortion of the present invention, the equalization is performed in the training sequence mode when the moving ghost does not exist in the channel and there is no possibility that the equalizer diverges, and the data mode is cancelled and the equalization is carried out in the blind mode when the moving ghost does not exist in the channel but there is a possibility that the equalizer diverges. Furthermore, the equalizer is executed in the data mode when there is no possibility that the equalizer diverges but there exists the moving ghost including slowly moving ghost in the channel, and the equalization is performed in the data mode and blind mode when the moving ghost exists and there is a possibility that the equalizer diverges. By doing so, the moving ghost in the channel, which changes every minute, can be effectively and quickly removed and the equalizer is stably carried out as fast as possible even when there is a possibility of divergence. Especially, the moving ghost that moves very slowly as well as the fast moving ghost are detected and removed, thereby improving the reliability of the system. Moreover, when the synchronizing signals are detected after initialization, there is a possibility that the equalizer diverges, or is completely diverged. Thus, the channel decoder is rest to restart the system, performing the equalization stably.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for compensating for channel distortion:
    (a) calculating a DC value from input data, reading the DC value a predetermined number of times in a specific cycle, detecting maximum and minimum values from the read DC values, judging if there is a moving ghost in the channel from a difference between the maximum and minimum values, and judging if there is a possibility that an equalizer diverges from a MSE of a signal equalized by the equalizer;
    (b) executing the equalization in a training sequence mode when it is judged that the moving ghost does not exist in the channel and there is no possibility that the equalizer diverges;
    (c) executing the equalization in a blind mode when it is judged that the moving ghost does not exist in the channel but there is a possibility that the equalizer diverges;
    (d) executing the equalization in a data mode when it is judged that the moving ghost exists in the channel and there is no possibility that the equalizer diverges; and
    (e) executing the equalization in the data mode and the blind mode when it is judged that the moving ghost exists in the channel and there is a possibility that the equalizer diverges.

2. A method of claim 1, further comprising resetting a channel decoder and a tuner when synchronizing signals of the input data are not detected.

3. A method of claim 1, further comprising resetting a channel decoder including the equalizer when it is judged that the equalizer completely diverged.

4. A method of claim 3, wherein the equalizer is judged to be completely diverged when said MSE value of the signal equalized by the equalizer is larger than a signal power.

5. A method of claim 4, wherein the signal power is obtained by squaring values assigned to levels of digital data and averaging the squared values.

6. A method of claim 1, wherein in (a):
    judging that there is no moving ghost in the channel when it is decided that the difference between said maximum and minimum values is smaller than a predetermined first critical value, and otherwise judging that the moving ghost exists in the channel; and
    judging that there is no possibility that the equalizer diverges when it is judged that said MSE value of the signal equalized by the equalizer is smaller than a predetermined second critical value, and otherwise judging that there is a possibility that the equalizer diverges otherwise.

7. A method of claim 6, wherein in (a) and (b), cancelling the data mode when it is judged that there is no moving ghost in the channel.

8. A method of claim 7, wherein setting a step size of the equalizer to a minimum when cancelling the data mode.

9. A method of claim 1, wherein in (c) setting a step size of the equalizer to a maximum when operating the equalizer in the blind mode.

10. A method of claim 1, wherein in (c) sequentially performing 2-level slicing, 4-level slicing and 8-level slicing, having a predetermined time interval therebetween when operating the equalizer in the blind mode.

11. A method of claim 1, wherein in (d) turning on the data mode when the moving ghost exists in the channel and when a VSB mode of the input data corresponds to a mode for terrestrial broadcasting.

12. A method of claim 11, wherein setting a step of the equalizer to a maximum when turning on the data mode.

13. A method of claim 11, wherein operating the equalizer in the data mode comprises:
    reading MSE values of the input and output of the equalizer when the data mode is judged to be turned on, and comparing the two MSE values;

cancelling the data mode, reading an MSE output by the equalizer when the data mode is cancelled and comparing the MSE value read when the data mode is cancelled with the MSE value read when the data mode is ON; and turning on the data mode again when it is judged that the MSE value output by the equalizer after the data mode is cancelled is larger than the MSE value output when the data mode is ON.

14. A method of claim 13, wherein the data mode is maintained in the ON state when it is judged that the MSE value output by the equalizer is smaller than the input MSE value, and maintained the data mode an OFF state when it is decided that the MSE value output when the data mode is cancelled is smaller than the MSE value output when the data mode is ON.

15. A method of claim 1, wherein in (e), turning on the data mode when the moving ghost exists in the channel and when the VSB mode of the input data corresponds to a mode for terrestrial broadcasting.

16. A method for compensating for channel distortion comprises:

calculating a DC value from input data, reading the DC value a predetermined number of times in a specific cycle, detecting maximum and minimum values from the read DC values and storing the maximum and minimum values;

shifting each values of a plurality of memories to a next memory and storing the minimum value in the memory which is finally left;

(a) judging if a moving ghost exists in the channel using a difference between the stored maximum and minimum values and a difference between the minimum value stored in the memory and a current maximum value, and judging if there is a possibility that an equalizer diverges from a MSE value of a signal equalized by the equalizer;

(b) performing an equalization in a training sequence mode when it is judged that the moving ghost does not exist in the channel and there is no possibility that the equalizer diverges;

(c) carrying out the equalization in a blind mode when it is judged that the moving ghost does not exist in the channel but there is a possibility that the equalizer diverges;

(d) executing the equalization in a data mode when it is judged that the moving ghost exists in the channel and there is no possibility that the equalizer diverges; and (e) performing the equalization in the data mode and the blind mode when it is judged that the moving ghost exists in the channel and there is a possibility that the equalizer diverges.

17. A method of claim 16, wherein (a) comprises:

deciding if the difference between the maximum and minimum values is smaller than a predetermined first critical value;

sequentially comparing the minimum values stored in the plurality of memories with a currently read maximum value and judging if the difference between a minimum value and a currently read value is larger than a predetermined second critical value when the difference between the maximum and minimum values is smaller than the predetermined first critical value; and judging that the moving ghost exists in the channel when the difference between the maximum and minimum values is larger than the first critical value, or the difference between the value stored in each memory and the currently read maximum value is larger then the second critical value.

18. A method of claim 16, wherein in (a), detecting whether the moving ghost exists while changing the cycle by which the DC value is read.

19. A method of claim 17, wherein, when it is judged that the moving ghost does not exist and a step size of the equalizer is a maximum, the data mode is cancelled and the step size is varied from a maximum through a middle value to a minimum, having a predetermined time interval therebetween.

20. A method of claim 17, wherein, when it is judged that there is no moving ghost, the data mode is cancelled after successively judging that the moving ghost does not exist a predetermined number of times.

21. A method for compensating for channel distortion comprising:

calculating a DC value from input data, reading the DC value a predetermined number of times in a specific cycle, detecting maximum and minimum values from the read DC values, calculating an average value of the maximum and minimum values and storing the average value;

shifting each values of a plurality of memories to the next memory and storing the average value in the memory which is finally left;

(a) judging if the moving ghost exists in the channel using a difference between the stored maximum and minimum values and the difference between the average value stored in the memory and a current average value, and judging if there is a possibility that an equalizer diverges from the MSE value of a signal equalized by the equalizer;

(b) performing an equalization in a training sequence mode when it is judged that the moving ghost does not exist in the channel and there is no possibility that the equalizer diverges;

(c) carrying out the equalization in a blind mode when it is judged that the moving ghost does not exist in the channel but there is a possibility that the equalizer diverges;

(d) executing the equalization in a data mode when it is judged that the moving ghost exists in the channel and there is no possibility that the equalizer diverges; and (e) performing the equalization in the data mode and the blind mode when it is judged that the moving ghost exists in the channel and when there is a possibility that the equalizer diverges.

22. A method of claim 21, wherein (a) comprises:

deciding if the difference between the maximum and minimum values is smaller than a predetermined first critical value;

sequentially comparing the average values stored in the plurality of memories with a currently read average value and judging if the difference between a stored average value and a currently read value is larger than a predetermined second critical value when the difference between the maximum and minimum values is smaller than the predetermined first critical value; and judging that the moving ghost exists in the channel when the difference between the maximum and minimum values is larger than the first critical value, or the difference between the value stored in each memory and the currently read average value is larger than the second critical value.

23. An apparatus which compensates for channel distortion, comprising:
- an analog/digital converter which converts an input signal into digital data;
- a synchronizing signal detector which detects synchronizing signals from the digital data;
- a VSB mode detector which detects a VSB mode from the digital data;
- an input MSE calculator which calculates a MSE of the digital data;
- a DC calculator which calculates a DC value included in the digital data;
- an equalizer which removes a ghost included in the digital data in at least one of a plurality of modes;
- an output MSE calculator which calculates the MSE of data equalized by the equalizer; and
- a controller which determines the equalization mode of the equalizer using the operation results of the VSB mode detector, the input MSE calculator, the DC calculator and the output MSE calculator, and generates a corresponding control signal.

24. An apparatus of claim 23, wherein the controller resets the equalizer when it is judged that the synchronizing signal detector did not detect the synchronizing signals, or the equalizer completely diverged.

25. An apparatus of claim 23, wherein the modes of the equalizer is a training sequence mode, a data mode and a blind mode.

* * * * *